(12) United States Patent
Deboy et al.

(10) Patent No.: US 11,509,228 B2
(45) Date of Patent: *Nov. 22, 2022

(54) DYNAMIC REGULATION RESONANT POWER CONVERTER

(71) Applicant: Infineon Technologies Austria AG, Villach (AT)

(72) Inventors: Gerald Deboy, Klagenfurt (AT); Matthias J. Kasper, Villach (AT); Juan Sanchez, Villach (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

This patent is subject to a terminal disclaimer.

(21) Appl. No.: 17/239,945

(22) Filed: Apr. 26, 2021

(65) Prior Publication Data

US 2021/0242786 A1 Aug. 5, 2021

Related U.S. Application Data

(63) Continuation-in-part of application No. 16/655,450, filed on Oct. 17, 2019, now Pat. No. 11,005,379.

(51) Int. Cl.
*H02M 3/335* (2006.01)
*H02M 1/00* (2006.01)

(52) U.S. Cl.
CPC .............. *H02M 3/33569* (2013.01)

(58) Field of Classification Search
CPC ..... H02M 3/33569; H02M 2001/0058; H02M 2007/4848; H02M 7/523
See application file for complete search history.

(56) References Cited

U.S. PATENT DOCUMENTS

| 6,975,098 | B2 | 12/2005 | Vinclarelli |
| 9,559,602 | B2 | 1/2017 | Deboy |
| 10,581,319 | B1* | 3/2020 | Lin ................. H02M 3/33553 |
| 2013/0058133 | A1 | 3/2013 | Farrington et al. |
| 2013/0265804 | A1 | 10/2013 | Fu et al. |
| 2016/0254755 | A1* | 9/2016 | Deboy ............. H02M 3/33546 363/21.02 |
| 2017/0054379 | A1 | 2/2017 | Nishikawa et al. |
| 2017/0093287 | A1* | 3/2017 | Dai ...................... H02M 3/338 |
| 2017/0117819 | A1 | 4/2017 | Chen et al. |
| 2017/0207708 | A1 | 7/2017 | Hari et al. |

(Continued)

FOREIGN PATENT DOCUMENTS

| JP | 2005065395 A | 3/2005 | |
| WO | WO-2013106692 A1 * | 7/2013 | ........ H02M 3/33507 |

OTHER PUBLICATIONS

EP Search Report, EP 20 20 1388, dated Feb. 23, 2021, pp. 1-11.
EP Office Action, EP 20 201 388.4, pp. 1-7, dated Aug. 22, 2022.

*Primary Examiner* — Sisay G Tiku
(74) *Attorney, Agent, or Firm* — Armis IP Law, LLC

(57) ABSTRACT

According to one configuration, a power system includes a resonant power converter, a monitor resource, and a controller. During operation, the resonant power converter converts an input voltage to an output voltage. The monitor resource monitors a magnitude of the input voltage. The controller dynamically controls a corresponding resonant frequency of the resonant power converter and a switching frequency of switches in the resonant power converter depending on a magnitude of the input voltage.

22 Claims, 33 Drawing Sheets

(56) References Cited

U.S. PATENT DOCUMENTS

| | | |
|---|---|---|
| 2017/0223792 A1 | 8/2017 | Elferich et al. |
| 2017/0331383 A1 | 11/2017 | Hsiao et al. |
| 2018/0191252 A1* | 7/2018 | Bianco .................. H02M 1/08 |
| 2018/0351469 A1* | 12/2018 | Kakalashvili ........... H02M 1/14 |
| 2019/0024545 A1 | 1/2019 | Viola et al. |
| 2019/0044434 A1 | 2/2019 | Elferich et al. |
| 2019/0068065 A1 | 2/2019 | Tanino et al. |
| 2019/0074731 A1 | 3/2019 | Lee et al. |
| 2019/0229628 A1 | 7/2019 | Halberstadt |
| 2019/0245451 A1 | 8/2019 | Sagneri et al. |
| 2020/0007044 A1 | 1/2020 | Sato et al. |
| 2020/0083818 A1* | 3/2020 | Lin ......................... H01F 3/14 |
| 2020/0195155 A1 | 6/2020 | Colbeck et al. |
| 2020/0287471 A1* | 9/2020 | Huang .............. H02M 3/33576 |
| 2021/0119546 A1* | 4/2021 | Deboy .............. H02M 3/33569 |

\* cited by examiner

MAP INFO.
138

| RANGE | INPUT VOLTAGE | RESONANT FREQUENCY | VIN | SWITCHING FREQUENCY |
|---|---|---|---|---|
| RANGE #1 | 40-45 VDC | RF SETTING #1 (RF1) | 40....... | (0.62 X RF1) |
| | | | 42....... | (0.67 X RF1) |
| | | | 44....... | (0.81 X RF1) |
| RANGE #2 | 45-53 VDC | RF SETTING #2 (RF2) | 46....... | (0.93 X RF2) |
| | | | 48....... | (1.0 X RF2) |
| | | | 50....... | (1.07 X RF2) |
| | | | 52....... | (1.19 X RF2) |
| RANGE #3 | 53-60 VDC | RF SETTING #2 (RF2) | 54....... | (1.27 X RF3) |
| | | | 56....... | (1.32 X RF3) |
| | | | 58....... | (1.38 X RF3) |
| | | | 60....... | (1.43 X RF3) |

FIG. 7

| RANGE | OUTPUT VOLTAGE | MAP INFO. 1380 RESONANT FREQUENCY | O.V. | FSW1 SWITCHING FREQUENCY |
|---|---|---|---|---|
| RANGE #11 | 430-525 VDC | RF SETTING #11 (RF11) | 525..... | (0.47 X RF11) |
|  |  |  | 500..... | (0.56 X RF11) |
|  |  |  | 475..... | (0.62 X RF11) |
|  |  |  | 450..... | (0.76 X RF11) |
| RANGE #12 | 410-430 VDC | RF SETTING #12 (RF12) | 425..... | (0.88 X RF12) |
|  |  |  | 420..... | (1.0 X RF12) |
| RANGE #13 | 350-407 VDC | RF SETTING #13 (RF13) | 400..... | (1.08 X RF13) |
|  |  |  | 375..... | (1.18 X RF13) |
|  |  |  | 350..... | (1.28 X RF13) |

FIG. 24

DYNAMIC REGULATION RESONANT POWER CONVERTER

RELATED APPLICATION

This application is a continuation in part application of earlier filed U.S. patent application Ser. No. 16/655,450 entitled "DYNAMIC REGULATION RESONANT POWER CONVERTER,", filed on Oct. 17, 2019, the entire teachings of which are incorporated herein by this reference.

BACKGROUND

Conventional CPUs (Central Processing Units), GPUs (Graphics Processing Units) and processors, for Artificial Intelligence (AI) chips require much higher currents and have a very high dynamic load profile and operate at significantly lower supply voltages compared to well-known CPUs having an integrated Voltage regulator module.

With increasing power consumption and lower input voltages of a respective VRM (Voltage Regulated Module) power stage, the classic architecture of providing 12V throughout the motherboard reaches its limitations. Modern hyperscale datacenter architectures typically operate on 48V DC, which is distributed by central power supplies throughout a respective rack. Certain modern processors run on 0.9V input voltage and have linear on-board voltage regulators to adjust the supply voltage of individual cores along their multi-chip solution.

BRIEF DESCRIPTION

This disclosure includes the observation that conventional power converters (such as intermediate bus converters) suffer from deficiencies. For example, certain power converters such as those that apply relatively low or no regulation are quite efficient when a input voltage is maintained within a narrow input voltage range. However, power converters typically must be designed to accommodate a wide range of input voltages. Without sufficient regulation outside of the narrow input voltage range, the magnitude of the output voltage falls outside a desirable narrow output voltage range.

Embodiments herein provide novel and improved efficiency of generating an output voltage via a resonant power converter over a wide range of input voltages.

More specifically, a power system as described herein includes a resonant power converter, a monitor resource, and a controller. During operation, the resonant power converter receives an input voltage and converts it into an output voltage. The monitor resource monitors a magnitude of the input voltage. Depending on a magnitude of the input voltage, the controller controls a respective gain provided by the resonant power converter to convert the input voltage to the output voltage.

Adjusting a gain provided by the resonant power converter depending on a magnitude of the input voltage as described herein provides more efficient conversion from an input voltage to an output voltage. For example, in most instances, the resonant power converter operates in a range of input voltage around an expected average value or narrow input voltage range. Embodiments herein include controlling the resonant power converter to operate in a highly efficient mode during conditions when the input voltage resides in the narrow or normal voltage range. When a magnitude of the input voltage falls outside the normal range, the output voltage would deviate if the resonant power converter were operated in the same gain mode implemented for the narrow input voltage range. In one embodiment, although less efficient outside the narrow range, the controller operates the resonant power converter in a higher gain mode to maintain the magnitude of the output voltage within a desired range.

Note that the controller can be configured to control any suitable one or more control parameters of the resonant power converter to maintain the magnitude of the output voltage within a desired range. For example, in yet further embodiments, the controller dynamically controls a switching frequency of switches in the resonant power converter depending on a magnitude of the input voltage. The controller also dynamically controls a magnitude of a corresponding resonant frequency of the resonant power converter depending on a magnitude of the input voltage. Dynamic control of the switching frequency and the resonant frequency associated with the resonant power converter as described herein maintains a magnitude of the output voltage within a desired voltage range.

One embodiment herein includes producing map information. The map information provides a mapping between the magnitude of the input voltage and a setting of the switching frequency applied to switches in the resonant power converter. Via the map information, the controller maps the magnitude of the input voltage to a switching frequency value. The controller then sets the identified switching frequency of controlling the switches to the switching frequency value.

Additionally, or alternatively, further embodiments herein include assigning each of multiple input voltage ranges a different resonant frequency setting. For example, embodiments herein include dividing an input voltage range (in which the input voltage may reside) into multiple input voltage ranges; and assigning a respective resonant frequency setting to each of the multiple input voltage ranges. Further embodiments herein can include implementing hysteresis to switch from one resonant frequency setting to another resonant frequency setting depending on whether a controller increases or decreases the resonance frequency setting. In one embodiment, it is desirable to avoid that the system constantly jumps between two values when operating at an input voltage where we would change the resonance frequency setting.

During operation, the controller detects a particular voltage range (of the multiple voltage ranges) in which the magnitude of the input voltage resides. In one embodiment, as previously discussed, each of the voltage ranges is assigned a respective resonant frequency setting. In such an instance, the controller identifies a resonant frequency setting assigned to the particular voltage range. The controller then controls the resonant power converter to operate at the identified resonant frequency setting assigned to the first voltage range.

Adjustment of the resonant frequency of the resonant power converter can include any suitable technique such as one or more of the following: adjusting a resonant capacitor component associated with the resonant circuit, such as adjusting a resonant inductor component associated with the resonant circuit, etc.

Additionally, or alternatively, note that the controller can be configured to control the resonant frequency of the resonant power converter circuit to be a fixed resonant frequency setting during conditions in which the magnitude of the input voltage falls within the particular voltage range of the multiple voltage ranges.

In yet further embodiments, to maintain the output voltage within a desired range, the controller varies a magnitude of the switching frequency as a magnitude of the input voltage varies within the particular voltage range.

Further embodiments herein include, while a magnitude of the switching frequency is set to a fixed value, via the controller, varying a magnitude of the resonant frequency depending on variations of the magnitude of the input voltage.

In accordance with further embodiments, the resonant power converter includes a first switch and a second switch. During operation, the controller controls switching of the first switch to selectively apply a first voltage (such as the input voltage) to an input of a resonant circuit of the resonant power converter; the controller controls switching of the second switch to selectively apply a second voltage (such as a ground reference voltage with respect to the input voltage) to the input of the resonant frequency circuit of the resonant power converter circuit.

In yet further embodiments, the multiple input voltage ranges include at least a first input voltage range and a second input voltage range. The first input voltage range is assigned a first resonant frequency setting; the second input voltage range is assigned a second resonant frequency setting. In such an embodiments, and as further discussed herein, a gain of the resonant power converter is a piecewise gain function including a first gain function associated with the first input voltage range and a second gain function associated with the second input voltage range. In one embodiment, a magnitude of the first gain function and a magnitude of the second gain function is substantially equal at a transition between the first input voltage range and the second input voltage range.

Further embodiments herein include a power system comprising: a monitor resource and a controller. The monitor resource is operative to monitor a magnitude of a voltage at a node of a resonant power converter. The controller is operative to, depending on the magnitude of the voltage at the node, dynamically control a respective gain provided by the resonant power converter.

In further example embodiments, the controller determines a switching frequency in which to control switches in the resonant power converter based on a combination of a resonant frequency of the resonant power converter and the magnitude of the voltage at the node. Operation of the resonant power converter at the resonant frequency and the determined switching frequency controls the respective gain of the resonant power converter.

Further embodiments herein include, via the controller or other suitable entity, mapping the magnitude of the voltage to a switching frequency value and setting a switching frequency of controlling switches in the resonant power converter to the switching frequency value.

In still further example embodiments, via the controller, depending on the magnitude of the monitored voltage, and to provide the respective gain, adjusting a resonant frequency of the resonant power converter. In one embodiment, this includes, via the controller or other suitable entity: i) detecting a first voltage range in which the magnitude of the voltage resides, the first voltage range being one of multiple voltage ranges associated with operation of the resonant power converter; ii) identifying a resonant frequency setting assigned to the first voltage range; and iii) controlling the resonant power converter to operate at the identified resonant frequency setting. In one nonlimiting example embodiment, each of the multiple voltage ranges is assigned a different resonant frequency setting.

Still further example embodiments herein include, via the controller, controlling a resonant frequency of the resonant power converter to be a fixed resonant frequency setting during conditions in which the magnitude of the voltage falls within a first voltage range; and varying a magnitude of a switching frequency applied to switches in the resonant power converter depending on the magnitude of the voltage within the first voltage range.

In yet further example embodiments, the controller is operative to set a magnitude of a switching frequency of operating switches in the resonant power converter to a fixed value. The controller varies a magnitude of a resonant frequency of the resonant power converter depending on variations in the magnitude of the voltage. In one embodiment, a voltage range of the resonant power converter is split into multiple voltage ranges, each voltage range of the multiple voltage ranges being assigned a respective resonant frequency setting.

Further embodiments herein include a power system comprising: a resonant power converter to convert an input voltage to an output voltage; a monitor resource operative to monitor a magnitude of the input output voltage; a controller operative to, depending on the magnitude of the input output voltage, dynamically control both a resonant frequency and a switching frequency of controlling switches in the resonant power converter to produce the output voltage, operation of the resonant power converter at the resonant frequency and the switching frequency setting a respective gain provided by the resonant power converter; and wherein the controller is operative to calculate the switching frequency based on a combination of the resonant frequency and the magnitude of the input output voltage.

In still further example embodiments, a power system comprising: a resonant power converter to convert an input voltage to an output voltage; a monitor resource operative to monitor a magnitude of the input output voltage; and a controller operative to, depending on the magnitude of the input output voltage and a resonant frequency of the resonant power converter, control a respective gain provided by the resonant power converter, the controller further operative to provide semi-regulated control of converting the input voltage into the output voltage, the semi-regulated control operated between a fully regulated operational mode and a fully unregulated operational mode.

Yet further example embodiments herein include a power system comprising: a resonant power converter to convert an input voltage to an output voltage; a monitor resource operative to monitor a magnitude of the input voltage; a controller operative to, depending on the magnitude of the input voltage, dynamically control both a resonant frequency and a switching frequency of controlling switches in the resonant power converter to produce the output voltage, operation of the resonant power converter at the resonant frequency and the switching frequency setting a respective gain provided by the resonant power converter; and wherein the controller is operative to calculate the switching frequency based on a combination of the resonant frequency and the magnitude of the input voltage.

These and other more specific embodiments are disclosed in more detail below.

Note that any of the resources implemented in system as discussed herein can include one or more computerized devices, controllers, monitors, mobile communication devices, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to produce an output voltage. The instructions, when executed by computer processor hardware, cause the computer processor hardware (such as one or more co-located or disparately located processor devices or hardware) to: monitor a magnitude of an input voltage supplied to a resonant power converter; set a resonant frequency of the resonant power converter depending on a magnitude of the input voltage; and dynamically control a switching frequency of switches in the resonant power converter depending on a magnitude of the input voltage, the resonant power converter converting the input voltage into an output voltage.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to switching power supplies, the concepts disclosed herein may be advantageously applied to any other suitable topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 7 is an example diagram illustrating of map information used to control operation of a resonant power converter according to embodiments herein.

FIG. 24 is an example diagram illustrating of map information used to control operation of a resonant power converter according to embodiments herein.

Figure 1:
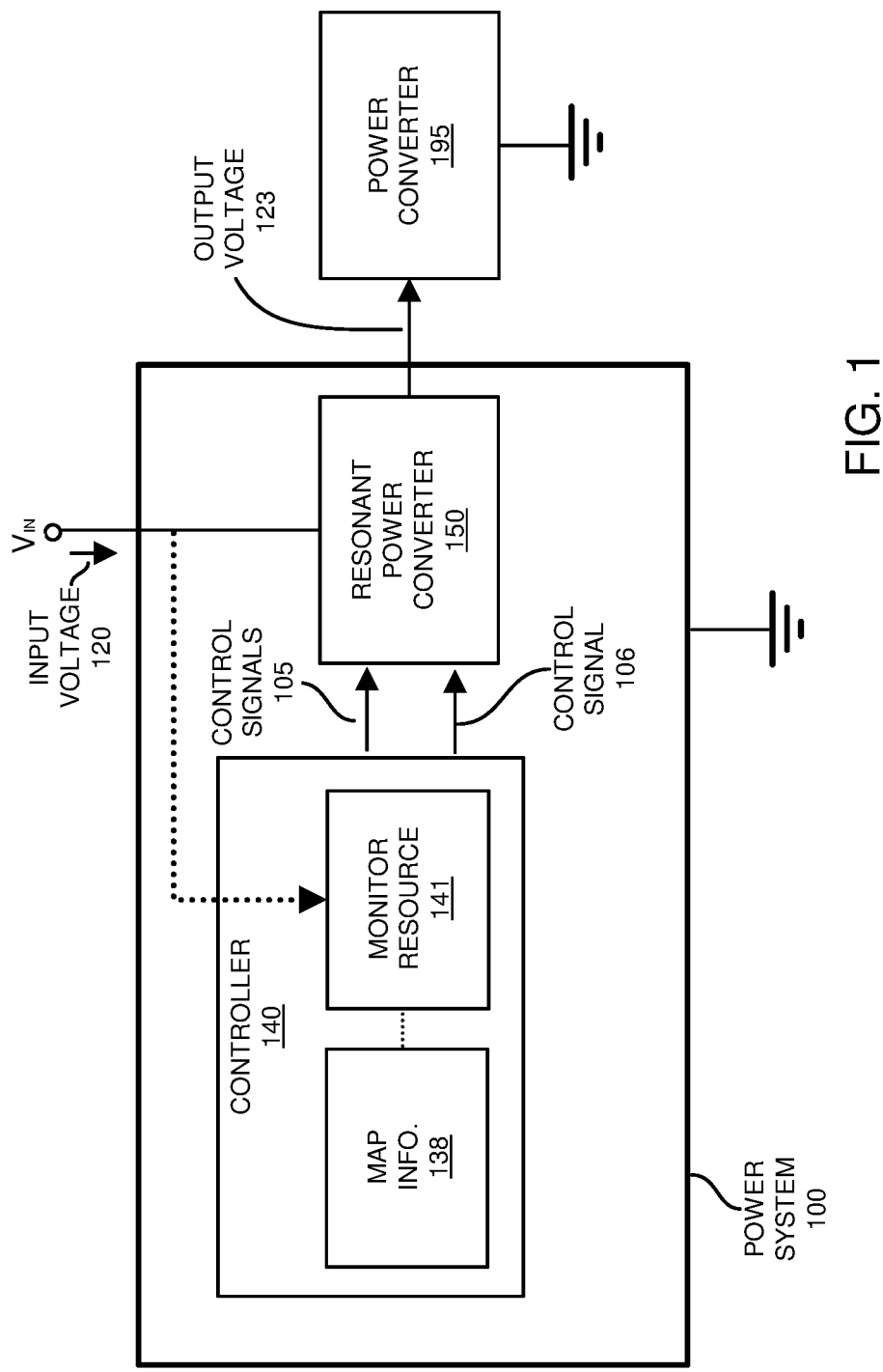
FIG. 1 is an example diagram illustrating a power supply (power system) including a resonant power converter according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Now, with reference to the drawings, FIG. 1 is an example diagram illustrating a power supply including a resonant power converter and corresponding controller according to embodiments herein.

As shown in this example embodiment, the power system 100 (i.e., power supply) includes controller 140 and resonant power converter 150. In one embodiment, the power system 100 receives an input voltage and delivers an output voltage. The load can be a power converter 195 as shown or can be directly a load such as a CPU with an integrated VRM. Note that embodiments herein can include piece-wise adjusting of the resonance frequency of the resonant power converter 150 depending on a magnitude of the input voltage 120, but providing full regulation within each of the input voltage regions. Embodiments herein include supplying the output voltage 123 directly to any kind of load.

The resonant power converter 150 can be any suitable type of power converter. For example, the power converter as described herein can be implemented in accordance with any isolated or non-isolated technology.

Examples of isolated power converter topologies include hard switching half bridge converters, LLC converters, phase shift ZVS (Zero Voltage Switching) converters, etc. Examples of non-isolated topologies include buck converters, switched capacitor converters, tapped inductor switched tank converters, combination converters such as buck/switched capacitor converters, etc.

In one embodiment, the resonant power converter 150 is a semi-regulated bus converter operative to convert the input voltage 120 into the output voltage 123. In such an instance, the amount of voltage regulation provided by the controller 140 varies depending on a magnitude of the input voltage. Note that further embodiments herein can include providing full regulation via a piece-wise set resonance frequency bands.

Note further that, in one embodiment, the controller 140 further includes monitor resource 141 and corresponding map information 138. During operation, as previously discussed, the resonant power converter 150 receives an input voltage 120 and converts it into an output voltage 123. As its name suggests, the monitor resource 140 monitors a magnitude of the input voltage 120. Depending on a magnitude of the input voltage 120, the controller 140 controls a respective parameter such as gain provided by the resonant power converter 150.

Thus, embodiments herein include adjusting a gain provided by the resonant power converter 150 depending on a magnitude of the input voltage 120 as monitored by the monitor resource 140.

In one embodiment, the gain associated with the resonant power converter 150 determines the voltage conversion ratio of the resonant power converter 150.

For example, the output voltage 123 (i.e., Vout), $$Vout=Vin*Ns/Np*\text{Gain},$$

where Vin is the input voltage 120, Ns=number of turns of the secondary winding associated with the transformer T1, Np=number of turns on the primary winding associated with the transformer T1, Gain is the gain provided by the resonant power converter 150.

$$\text{Gain}=(Vout/Vin)*(Np/Ns),$$

or more generally, Gain=(Vout/Vin)*Scale-Factor, where the scale factor is any suitable value chosen to convert an input voltage within an input voltage range to a respective output voltage in a desired output voltage range.

Adjusting the gain (such as Vin times some scale factor) associated with the resonant power converter 150 provides more efficient conversion of the input voltage 120 to an output voltage 123 for varying input voltage settings. In one embodiment, embodiments herein include operating the resonant power converter 150 as close as possible to a gain of around 1 to maximize efficiency.

More specifically, assume that for a majority of time, the resonant power converter 150 receives an input voltage 120 that is close in value (such as within 5% of point) to an expected average value such as 48 VDC. In such an instance, conversion efficiency is very high. As further discussed herein, embodiments herein include controlling the resonant power converter 150 to operate in a highly efficient low gain mode during conditions when the input voltage resides in a normal voltage range such as between 45 VDC and 53 VDC. When a magnitude of the input voltage falls outside this normal range (such as when the input voltage 120 is greater than 53 VDC or less than 46 VDC), the output voltage 123 would deviate if the resonant power converter were operated in the most efficient gain mode close to a gain of 1 associated with the normal voltage range as previously discussed. In accordance with embodiments herein, although less efficient, in order provide better regulation of the output voltage 123 (such as an output voltage closer to a desired target value without providing full regulation, which is less efficient), the controller 140 operates the resonant power converter 150 in a non-unity gain mode (where the gain is substantially higher than one or substantially lower than one when the input voltage 120 falls outside the normal range to maintain the magnitude of the output voltage 123 within a desired range. Further details are discussed below.

Note that the controller 140 can be configured to control any suitable one or more control parameters of the resonant power converter 150 to maintain the magnitude of the output voltage 123 within a desired range. The power system 100 supplies the output voltage 123 to any suitable load or power converter 195, which further converts the output voltage 123 into a highly regulated supply voltage that powers a load.

For example, in one embodiment, depending on the magnitude of the input voltage 120, the controller 140 dynamically controls parameters such as: i) a switching frequency of switches in the resonant power converter, ii) a resonant frequency of the resonant power converter 150, etc.

Dynamic control of the switching frequency and/or the resonant frequency operation associated with the resonant power converter 150 maintains a magnitude of the output voltage 123 within a desired voltage range, closer to a desired target DC voltage value.

Note further that embodiments herein optionally include producing map information 138. When implemented, the map information 138 provides a mapping between the magnitude of the input voltage 120 and a setting of the switching frequency applied to one or more switches in the resonant power converter 150. Thus, via the map information 138, as further discussed herein, the controller 140 maps the current magnitude of the input voltage 120 to a resonant frequency value and sets the resonant frequency operation of the resonant power converter 150 to the resonant frequency value.

Additionally, or alternatively, the controller 140 maps the current magnitude of the input voltage 120 to an appropriate switching frequency value, Fsw. The controller 140 then sets the switching frequency of the resonant power converter 120 to the switching frequency value.

Figure 2:
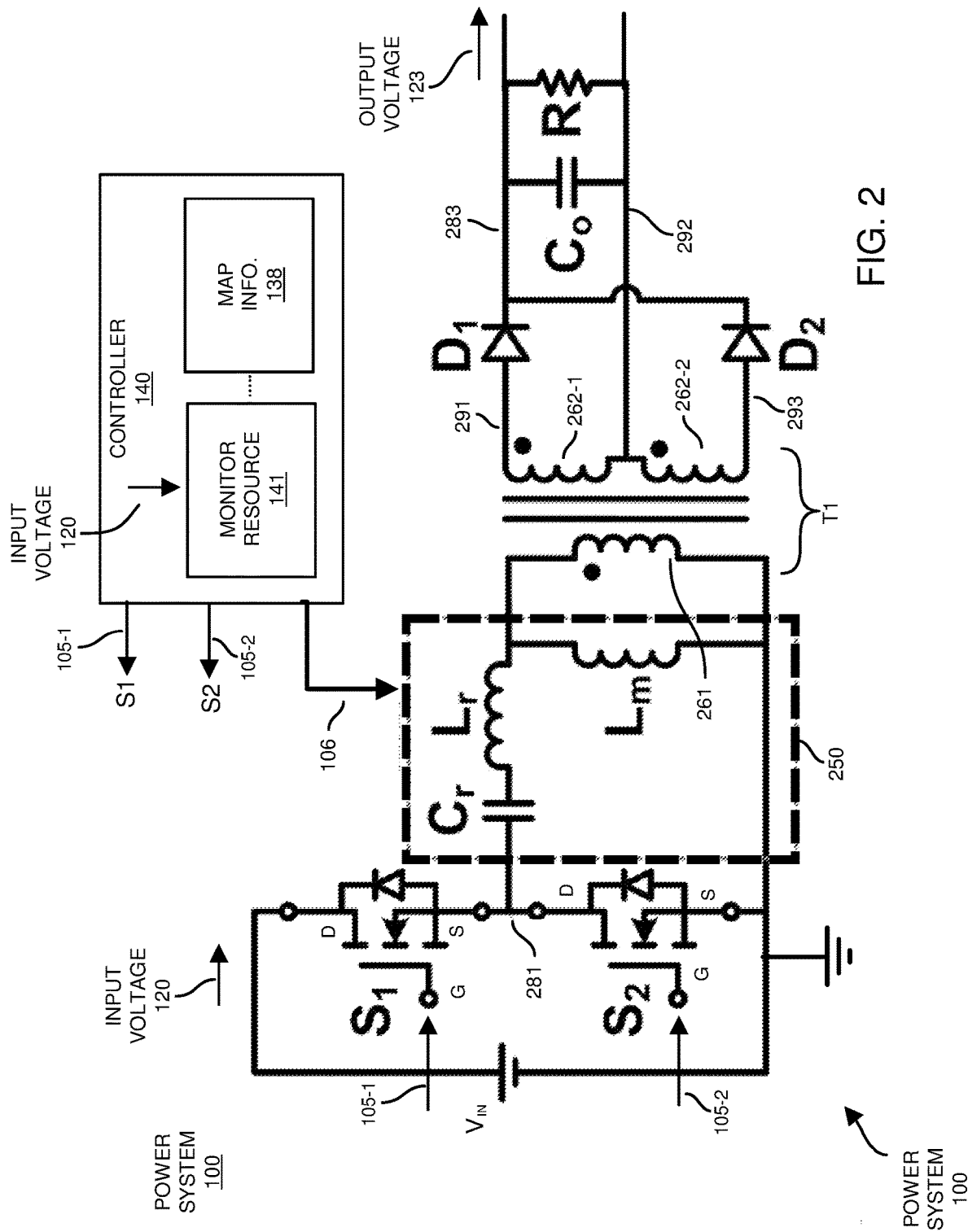
FIG. 2 is an example diagram illustrating details of a resonant power converter and a corresponding controller according to embodiments herein.

FIG. 2 is an example diagram illustrating details of a resonant power converter and a corresponding controller according to embodiments herein.

As shown, the power system 100 includes controller 140, input voltage source Vin, switches S1 and S2, capacitor Cr, inductor Lr, transformer T1 (such as a tapped-transformer), diode D1, diode D2, capacitor Co, and resistor R.

As previously discussed, the controller 140 includes monitor resource 141 and map information 138.

Further in this example embodiment, as shown, the switches S1 and S2 are coupled in series between the input voltage source Vin and corresponding ground reference. For example, the drain node (D) of the switch S1 is coupled to the input voltage source Vin. At node 281, the source node (S) of switch S1 is coupled to the drain node (D) of switch S2 as well as a corresponding node of capacitor Cr.

The source node (S) of switch S2 is coupled to the ground reference voltage.

The controller 140 is coupled to drive the control signal 105-1 to the gate node (G) of switch S1; the controller 140 is coupled to drive the control signal 105-2 to the gate node (G) of switch S2.

As further shown, resonant circuit 250 such as the combination of the capacitor Cr, inductor Lr, and primary winding 261 of the transformer T1 are connected in series between node 281 and ground. Inductor Lm represents the magnetizing inductance associated with the primary winding 261 of transformer T1.

The primary winding of T1 is magnetically coupled to both secondary winding 262-1 and secondary winding 262-2. If desired, node 292 (such as tap associated with the transformer T1) can be connected to ground. Each of the primary winding 261 and secondary windings 262 can include any suitable number of turns. In one nonlimiting example embodiment, the windings include an appropriate number of turns such that the resonant power converter 150 converts, on average, an input voltage 123 of 48 VDC into an output voltage of 6 VDC, although the resonant power converter 150 can be configured to provide any suitable voltage conversion.

Yet further, diode D1 is connected between the node 291 of the transformer T1 and the output voltage node 283. Diode D2 is connected between the node 293 of the transformer T1 and the output voltage node 283.

Finally, capacitor Co is coupled between the output voltage node 283 in the node 292. Resistor R is connected between the output voltage node 283 and the node 292.

Thus, in this example embodiment shown, the resonant power converter 150 includes a first switch S1 and a second switch S2.

During operation, the controller 140 controls switching of the first switch S1 to selectively apply a first voltage (such as the input voltage 120) to an input (node 281) of the resonant circuit 250 of the resonant power converter 150; the controller 140 controls switching of the second switch S2 to selectively apply a second voltage (such as a ground reference voltage with respect to the input voltage) to the input (node 281) of the resonant circuit 250 of the resonant power converter circuit 150.

In accordance with further embodiments, switching of the switches S1 and S2 during each of multiple control cycles includes a first switch setting of activating the switch S1 (providing a low resistive path between respective source and drain nodes) for a duration of time while switch S2 is deactivated (providing a high resistive path). Switching of the switches S1 and S2 during each of multiple control cycles further includes a second switch setting such as activating the switch S2 (providing a low resistive path between respective source and drain nodes) for a duration of time while switch S1 is deactivated (providing a high resistive path). The controller 140 repeatedly switches between the first switch setting and the second switch setting to convert the input voltage 120 into the output voltage 123.

As previously discussed, the map information 138 provides a mapping between the magnitude of the input voltage 120 and a setting of the resonant frequency associated with operating the resonant power converter 150. Thus, via the map information 138, the controller 140 maps the current magnitude of the input voltage 120 to a resonant frequency value and sets the resonant frequency operation of the resonant power converter 150 (specifically resonant circuit 250) to the selected resonant frequency value.

In one embodiment, control of the resonant frequency associated with the resonant circuit 250 can be achieved in any suitable manner. For example, any of one or more components capacitor Cr, inductor Lr, and inductor Lm can be adjusted to change a resonant frequency of the resonant circuit 250.

Additionally, or alternatively, as further discussed herein, the controller 140 maps the current magnitude of the input voltage 120 to a switching frequency value, Fsw, associated with controlling switches S1 and S2. For example, the controller 140 sets the switching frequency (Fsw) of producing the control signals 105-1 and 105-2 of the resonant power converter 120 to the selected switching frequency value (Fsw).

Again, in one embodiment, the gain associated with the resonant power converter 150 determines the voltage conversion ratio of the LLC (together with the transformer T1 turn ratio).

For example, the output voltage 123 (i.e., Vout), $$Vout=Vin*Ns/Np*Gain,$$

where Vin is the input voltage 120, Ns=number of turns of the secondary winding associated with the transformer T1, Np=number of turns on the primary winding associated with the transformer T1, Gain is the gain provided by the resonant power converter 150.

$$Gain=(Vout/Vin)*(Np/Ns)$$

Figure 3:
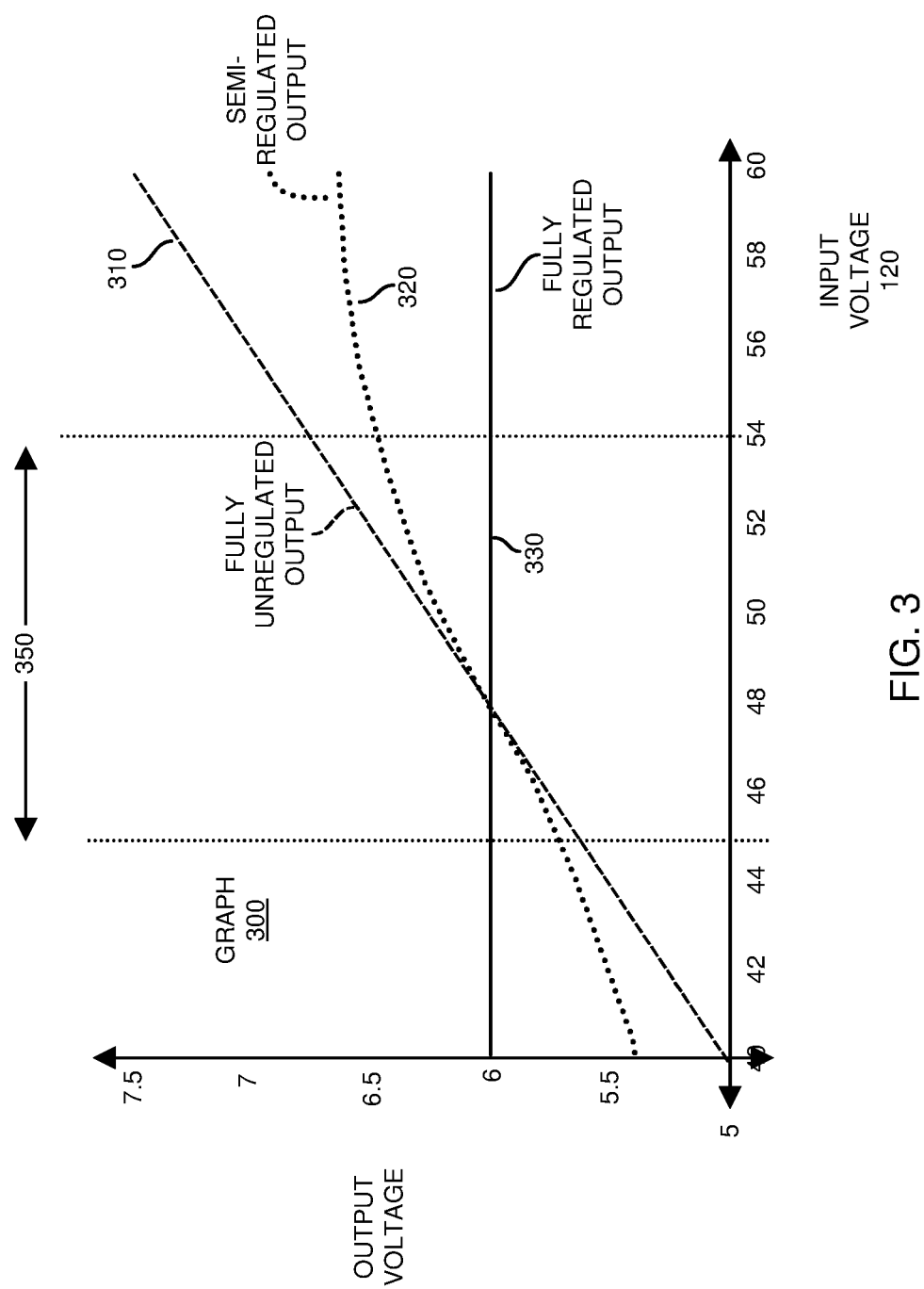
FIG. 3 is an example graph illustrating a magnitude of an output voltage over a range of different magnitudes of an input voltage according to embodiments herein.

FIG. 3 is an example graph illustrating operation of a resonant power converter over a range of different magnitudes of input voltage according to embodiments herein.

Conventional techniques include implementation of function 310 or function 330 to generate a respective output voltage. For example, when the conventional power converter function 330 (full regulation) is implemented to convert an input voltage into an output voltage, the output voltage is a constant target voltage (such as 6 VDC) regardless of a magnitude of the input voltage. When the function 310 (fully unregulated mode) is implemented to convert an input voltage into an output voltage, the output voltage linearly varies depending on a magnitude of the input voltage 120. As further discussed herein, the controller 140 is operative to provide semi-regulated control (mode 320) of converting the input voltage 120 into the output voltage 123, the semi-regulated control operated between a fully unregulated operational mode (310) and a fully regulated operational mode (330).

Figure 4:
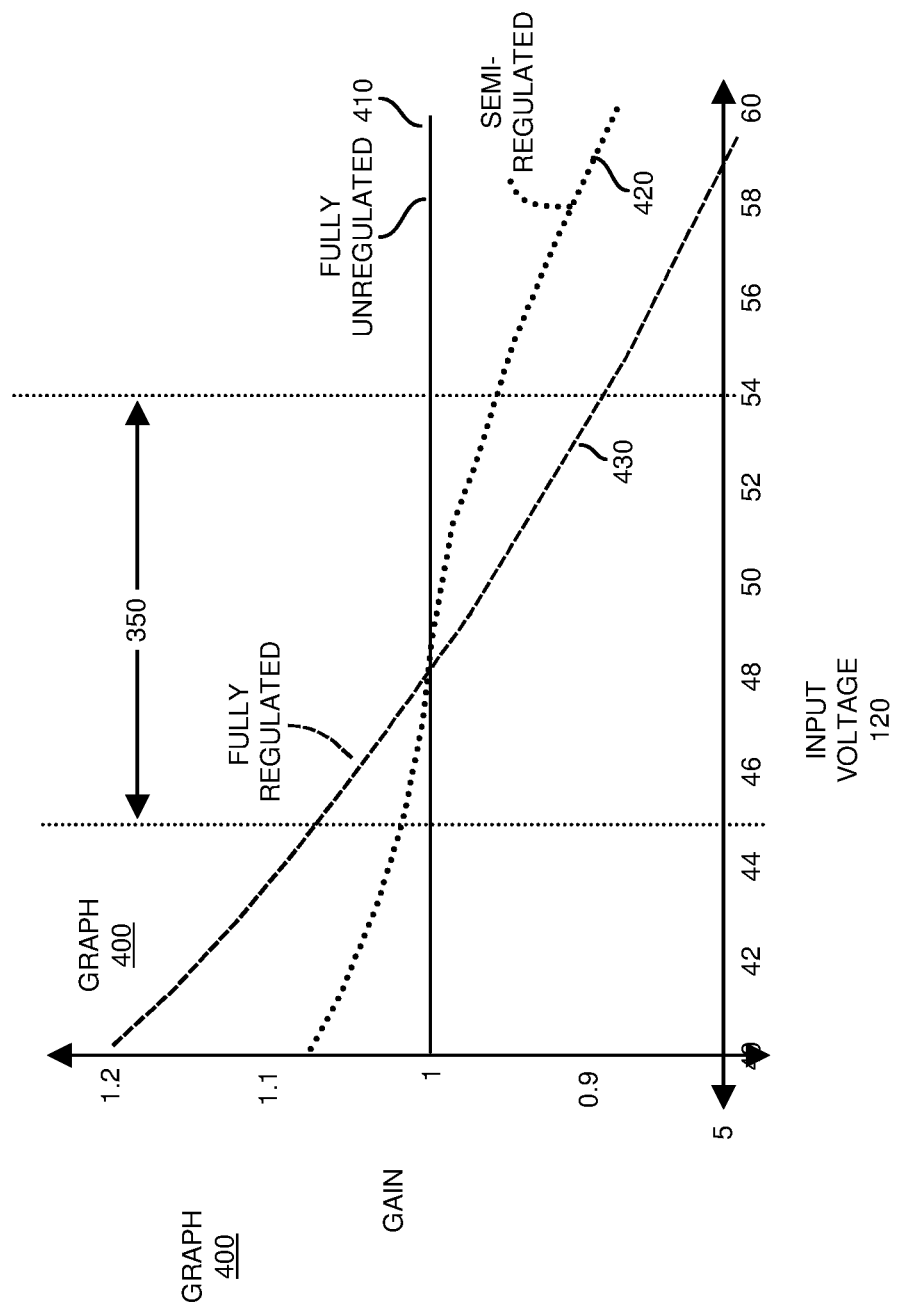
FIG. 4 is an example graph illustrating a gain of a resonant power converter over a range of different magnitudes of an input voltage according to embodiments herein.

Embodiments herein include implementation of an advanced transfer function 320 (semi-regulated output) as shown in graph 300. In this case the converter would provide little to no regulation in a central band 350 of input voltage values, while providing semi-regulation both at the upper end (such as input voltages greater than band 350) and lower end (such as input voltages less than band 350) of the full input voltage range between 40 and 60 VDC. In this case, operation of a power converter 150 as described herein in band 350 provides high efficiency, which is operation for a majority of time in which the resonant power converter 150 converts the input voltage 120 into the output voltage 123. Operation outside the band 350 is slightly less efficient, but provides better regulation of the output voltage 123 than does the fully unregulated function 310. Accordingly, embodiments herein include providing varying degrees of regulation depending on a magnitude of the input voltage 120 and which of multiple different input voltage ranges the magnitude falls. In one embodiment, the term degrees of regulation means how fast gain is adjusted as a function of varying input voltage FIG. 4 is an example graph illustrating operation of a resonant power converter over a range of different magnitudes of input voltage according to embodiments herein.

Graph 400 illustrates example gain 420 associated with the resonant power converter 150 over a range of different input voltage values such as between 40 VDC and 60 VDC. As shown, gain 420 falls between gain 410 associated with a fully unregulated power converter and gain 430 associated with a fully regulated power converter.

Figure 5:
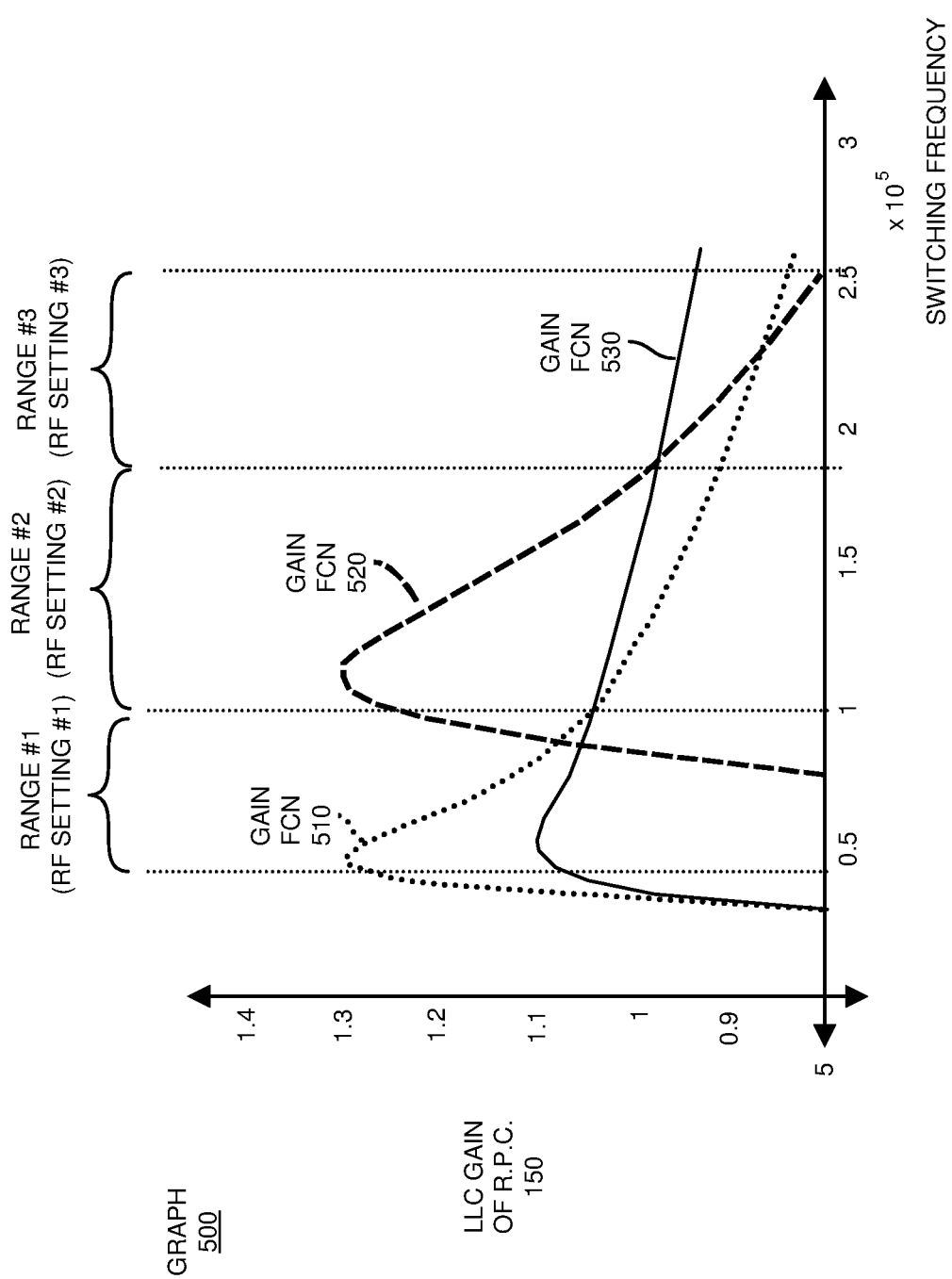
FIG. 5 is an example graph illustrating gain functions associated with different resonant frequency settings of a resonant power converter over a range of different magnitudes of an input voltage according to embodiments herein.

FIG. 5 is an example graph illustrating operation of a resonant power converter over a range of different magnitudes of input voltage according to embodiments herein.

Further embodiments herein include splitting the input voltage range (such as between 40 VDC and 60 VDC) associated with the resonant power converter 150 into any number of ranges. In this example embodiment, the input voltage range associated with the resonant power converter 150 is split into multiple ranges such as range #1, range #2, range #3.

Yet further embodiments herein include assigning each of the multiple voltage ranges a different resonant frequency setting. In such an instance, the resonant power converter 150 provides a different gain function when converting the input voltage 120 into an output voltage 123.

Note that embodiments herein include not only adjusting the resonant frequency setting. For example, embodiments herein include adjusting the gain function as shown in FIG. 5. This typically includes changing the ratio of Lr/Lm of the converter. In one embodiment, there are three different operating ranges with distinctly different gain functions.

For example, for a first resonant frequency RF #1 (such as corresponding to operation of the resonant power converter 150 at a first resonant frequency value) of the resonant power converter 150, the resonant power converter 150 provides gain as indicated by gain function 510 over different magnitudes of the input voltage 120.

For a second resonant frequency setting RF #2 (such as corresponding to operation of the resonant power converter 150 at a second resonant frequency value) of the resonant power converter 150, the resonant power converter 150 provides gain as indicated by gain function 520 over different magnitudes of the input voltage 120.

For a third resonant frequency setting RF #3 (such as corresponding to operation of the resonant power converter 150 at a second resonant frequency value) of the resonant power converter 150, the resonant power converter 150 provides gain as indicated by gain function 530 over different magnitudes of the input voltage 120.

As previously discussed, the resonant frequency of the resonant power converter 150 can be adjusted via adjusting settings of the resonant circuit 250. For example, via control signal 106 (one or more control signals), adjustment of the resonant frequency of the resonant power converter 150 can include any suitable technique such as one or more of the following: adjusting a magnitude of capacitance provided by resonant capacitor component (such as capacitor Cr) associated with the resonant circuit 250, adjusting a magnitude of inductance provided by the resonant inductor component (such as inductor Lr) associated with the resonant circuit 250, etc.

Adjusting the magnitude of the capacitance (Cr) associated with the resonant power converter 150 can include selectively coupling a number of capacitors in parallel.

As further shown, the graph 500 illustrates how the gain provided by the resonant power converter 150 changes based on different settings of the switching frequency Fsw used by the controller 140 to produce the control signals 105 driving gates of respective switches S1 and S2.

Figure 6:
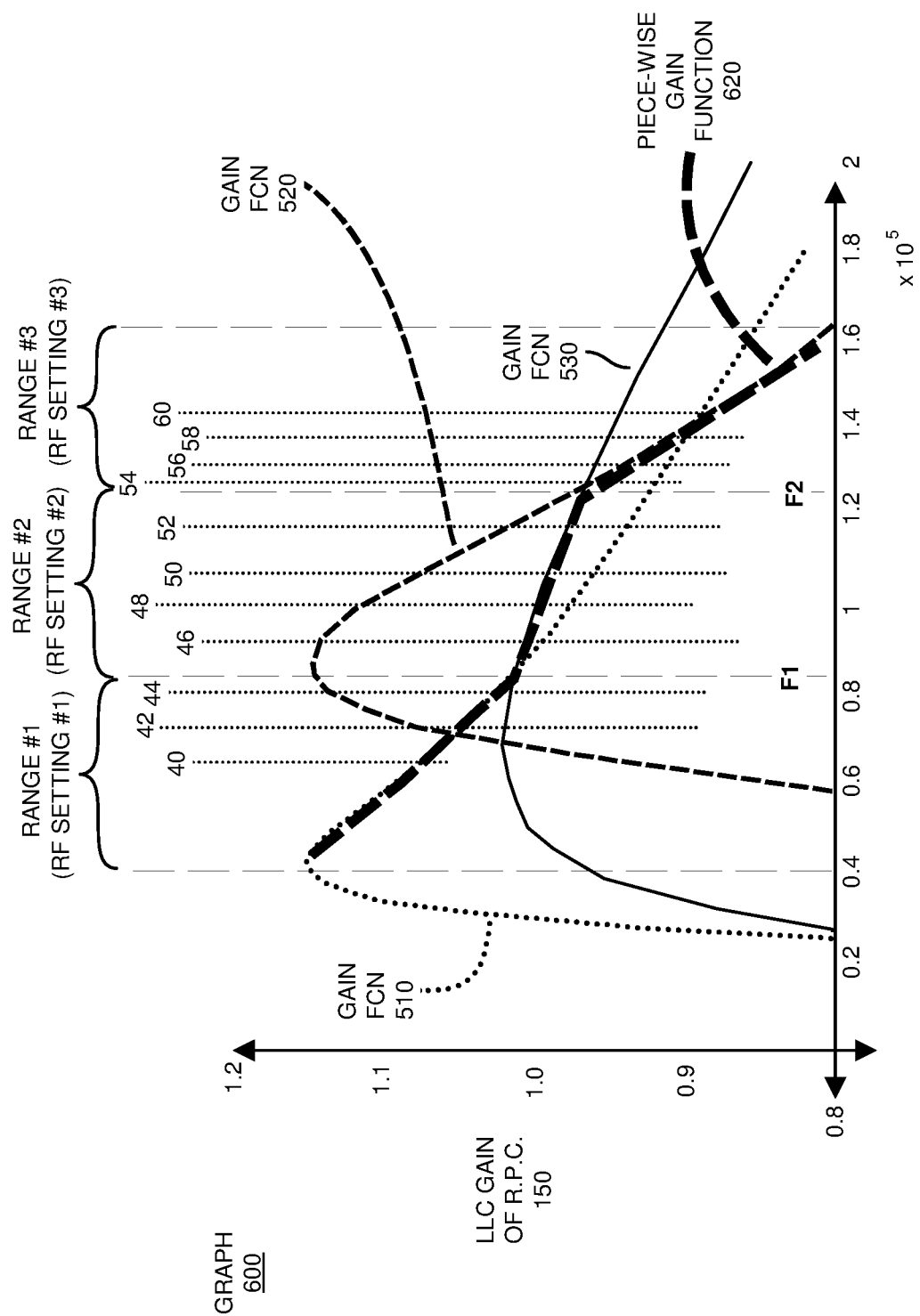
FIG. 6 is an example graph illustrating a attributes of a piece-wise gain function over a range of different magnitudes of an input voltage according to embodiments herein.

FIG. 6 is an example graph illustrating operation of a resonant power converter over a range of different magnitudes of input voltage according to embodiments herein.

As previously discussed, the input voltage range such as between 40 VDC and 60 VDC can be split up into multiple ranges including range #1, range #2, and range #3.

Each input voltage range is assigned a different resonant frequency setting. For example, the first input voltage range #1 is assigned a first resonant frequency setting RF setting #1; the second input voltage range #2 is assigned a second resonant frequency setting RF setting #2; the third input voltage range #3 is assigned a third resonant frequency setting RF setting #3.

The controller 140 uses each of the resonant frequency settings associated with the different ranges and the switching frequency Fsw to control operation of the resonant power converter 150. In such embodiments, a gain of the resonant power converter 150 is a piece-wise gain function including a combination of: i) a first gain function such as a portion of gain function 510 in range #1, ii) a second gain function such as a portion of gain function 520 in range #2, and iii) a third gain function such as a portion of gain function 530 in range #3.

In this example embodiment, the piece-wise gain function 620 in graph 600 illustrates how the magnitude of the first gain function 510 and a magnitude of the second gain function 520 is substantially equal at a transition frequency F1 between the first input voltage range (range #1) and the second input voltage range (range #2). Additionally, the magnitude of the second gain function 510 and a magnitude of the third gain function 530 is substantially equal at a transition frequency F2 between the second input voltage range (range #2) and the third input voltage range (range #3). As previously discussed, embodiments herein include implementing hysteresis when transition from using one gain function to the next. For example, when operating in range 2, the controller does not switchover to using range #1 until the input voltage is less than a threshold value F1. After operating in range #1, the controller does not switchover to operating in the range #2 again until the input voltage is greater than the threshold value plus an offset value.

Note that, fundamentally, a piece-wise defined gain function as shown in FIG. 6 is compatible both with a full regulation approach and with a semi-regulated approach as shown in FIG. 3. Embodiments herein can include full regulation with piece-wise adjustable gain function and semi-regulated approach with or without piece-wise adjusted gain function.

FIG. 7 an example diagram illustrating of map information used to control operation of a resonant power converter according to embodiments herein.

Map information 138 indicates settings of the resonant power converter 150 for each of different input voltage magnitudes. For example, in accordance with the piece-wise function 620, map information 138 indicates to: i) set the resonant frequency of the resonant circuit 250 to resonant frequency setting #1 for instances in which the magnitude of the input voltage 120 falls within the first input voltage range #1 (between 38 VDC and 45 VDC), ii) set the resonant frequency of the resonant circuit 250 to resonant frequency setting #2 for instances in which the magnitude of the input voltage 120 falls within the second input voltage range #2 (between 45 VDC and 53 VDC), and iii) set the resonant frequency of the resonant circuit 250 to resonant frequency setting #3 for instances in which the magnitude of the input voltage 120 falls within the third input voltage range #3 (between 53 VDC and 65 VDC).

As previously discussed, via control signal 106 outputted from the controller 140 (FIG. 2), setting of the resonant frequency associated with the resonant circuit 250 can include controlling settings of any suitable components in the resonant circuit 250.

As further shown, the map information 138 provides, for each input voltage range, a mapping of a magnitude of the input voltage to a corresponding switching frequency setting to be applied to the control signals 105 so that the resonant power converter 150 provides appropriate gain to convert the input voltage 120 to the output voltage 123.

More specifically, referring again to FIG. 2, during operation, the controller 140 determines a voltage range (of the multiple voltage ranges) in which the magnitude of the input voltage resides and applies an appropriate resonant frequency setting.

Assume that the monitor resource 141 detects that the magnitude of the input voltage is 40 VDC. In such an instance, the controller 140 detects that 40 VDC falls within the first range #1. The controller 140 then applies the corresponding resonant frequency setting #1 (RF 1) associated with range #1 to the resonant circuit 250. The controller 140 further maps 40 VDC to a switching frequency of 0.62×RF 1 (where RF is associated with range #1) and applies this switching frequency to the control signals 105.

As previously discussed, the magnitude of the input voltage 120 changes over time. Assume that the monitor resource 141 detects that the magnitude of the input voltage is 48 VDC. In such an instance, the controller 140 detects that 48 VDC falls within the first range #2. The controller 140 then applies the corresponding resonant frequency setting #2 (RF 2) associated with range #2 to the resonant circuit 250. The controller 140 further maps 48 VDC to a switching frequency of 1.0×RF 2 and applies this switching frequency to the control signals 105. In one embodiment, this is a point of optimal conversion efficiency associated with conversion of the input voltage 120 to the output voltage 123.

Sometime later, assume that the monitor resource 141 detects that the magnitude of the input voltage is 56 VDC. In such an instance, the controller 140 detects that 56 VDC falls within the range #3. The controller 140 then applies the corresponding resonant frequency setting #3 (RF 3) associated with range #3 to the resonant circuit 250. The controller 140 further maps 56 VDC to a switching frequency of 1.32×RF 3 and applies this switching frequency to the control signals 105.

As previously discussed, operating in range #1 and range #3 may provide less efficient conversion than operating in the range #2. However, the operation in range #1 and range #3 provides appropriate gain such that a magnitude of the output voltage 123 is maintained closer to a desired target value such as 6 VDC.

Note that embodiments herein as described in FIGS. 5 and 6 can be considered independent ideas, which may be implemented separately.

Figure 8:
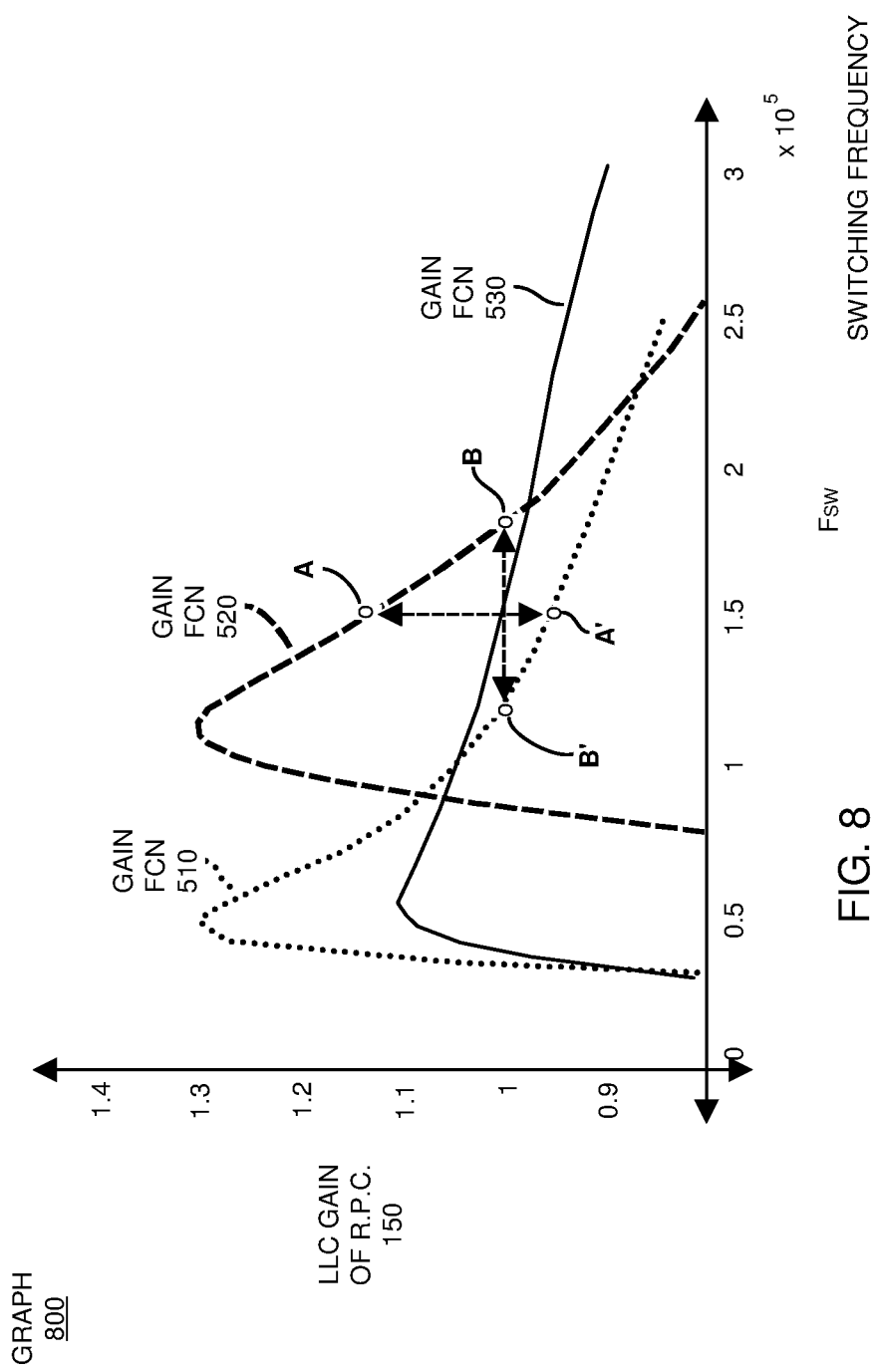
FIG. 8 is an example diagram illustrating adjustment of a switching frequency and/or a gain of a resonant power converter according to embodiments herein.

FIG. 8 is an example diagram illustrating adjustment of a switching frequency and/or a gain of a resonant power converter according to embodiments herein.

According to further embodiments herein, the controller 140 can be configured to change either the resonant frequency associated with the resonant circuit 250 or switching frequency Fsw to control the operation of the resonant power converter 150.

For example, assume that the controller 140 initially operates the resonant power converter at a resonant frequency setting #2 and switching frequency of around 150 KHz as indicated by the operating point A in graph 800. In such an instance, to change the gain associated with the resonant power converter 150, the controller 140 adjusts the resonant frequency of the resonant power converter 150 from gain function 520 to gain function 510 (associated with resonant frequency setting #1) as indicated by the operating point A' while the switching frequency is set to a fixed value such as 150 KHz.

Accordingly, while a magnitude of the switching frequency is set to a fixed value such as 150 KHz, the controller 140 can be configured to vary a magnitude of the resonant frequency of the resonant power converter 150 (such as from resonant frequency setting #2 to resonant frequency setting #1 or other suitable settings) to control a respective gain of the resonant power converter 150 and conversion of the input voltage 120 to the output voltage 123.

As another example, assume that the controller 140 initially operates the resonant power converter at a resonant frequency setting #2 (associated with gain function 520) and switching frequency of around 182 KHz as indicated by the operating point B. In such an instance, to maintain the gain associated with the resonant power converter 150 to be fixed, as indicated by the operating point B'(gain function 510), the controller 140: i) adjusts the resonant frequency of the resonant power converter 150 to resonant frequency setting #1, and ii) adjusts the switching frequency from 182 KHz to 115 KHz.

Accordingly, embodiments herein include modifying both the resonant frequency of the resonant circuit 250 and a switching frequency Fsw of the resonant power converter 150 to maintain the gain at a constant value.

Figure 9:
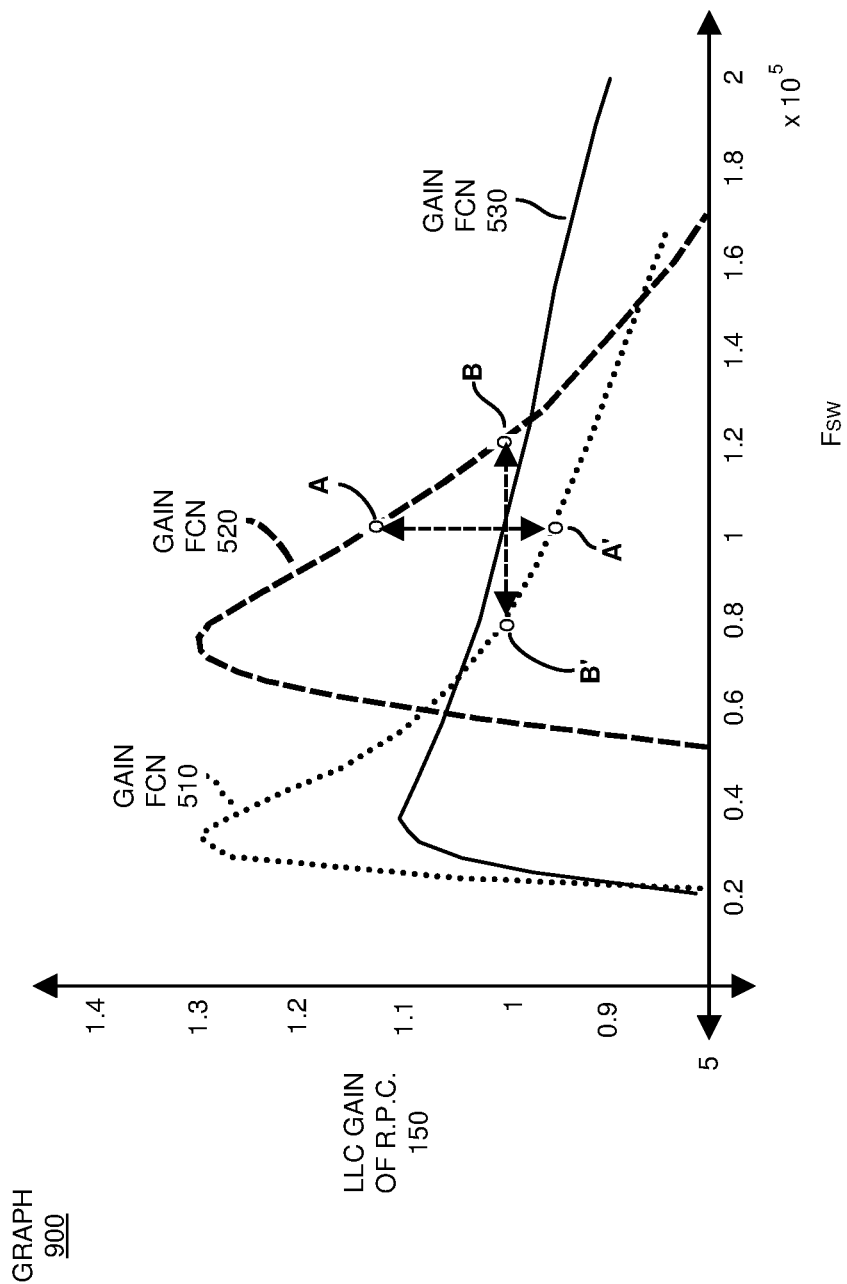
FIG. 9 is an example diagram illustrating adjustment of a switching frequency and/or a gain of a resonant power converter according to embodiments herein.

FIG. 9 is an example diagram illustrating adjustment of a normalized switching frequency and/or a gain of a resonant power converter according to embodiments herein.

As previously discussed, the resonant frequency and/or switching frequency associated with the resonant power converter 150 can be changed to control operation of the power system 100 and conversion of the input voltage 120 to the output voltage 123.

Figure 10:
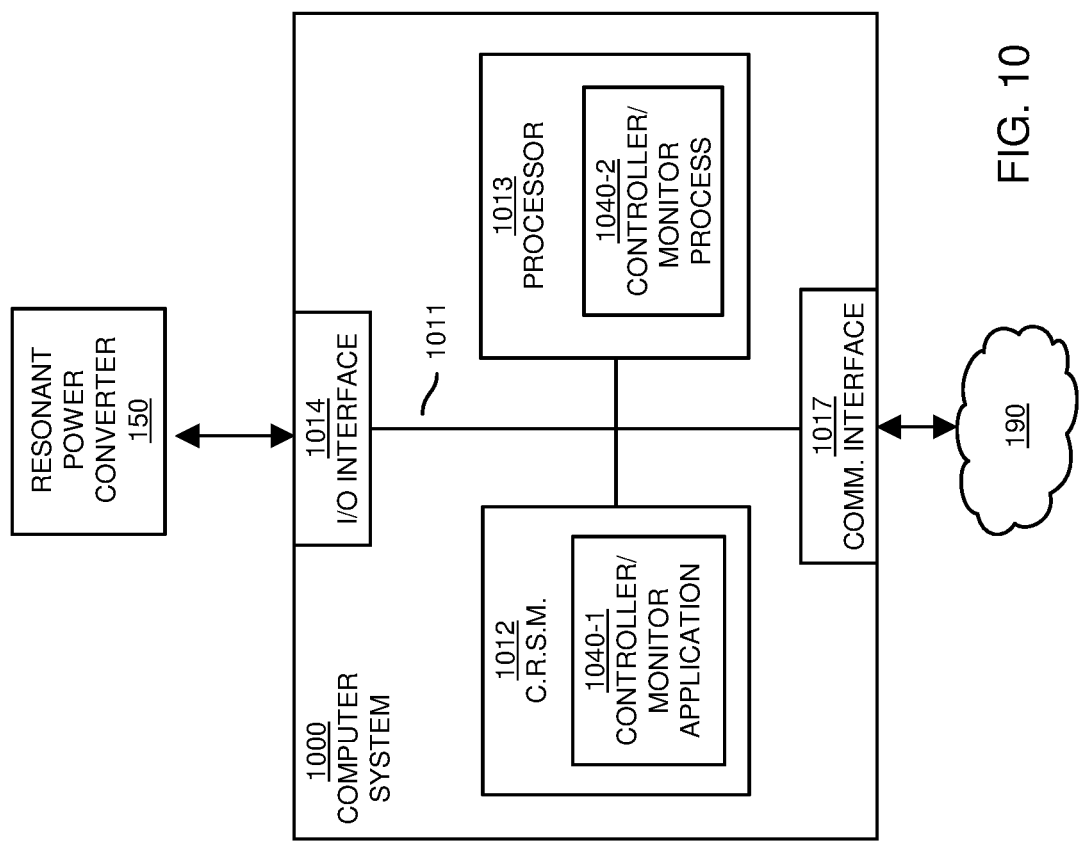
FIG. 10 is an example diagram illustrating example computer architecture operable to execute one or more methods according to embodiments herein.

FIG. 10 is an example diagram illustrating example computer architecture operable to execute one or more methods according to embodiments herein.

As previously discussed, any of the resources (such as controller 140, etc.) as discussed herein can be configured to include computer processor hardware and/or corresponding executable instructions to carry out the different operations as discussed herein.

As shown, computer system 1000 of the present example includes an interconnect 1011 that couples computer readable storage media 1012 such as a non-transitory type of media (which can be any suitable type of hardware storage medium in which digital information can be stored and retrieved), a processor 1013 (computer processor hardware), I/O interface 1014, and a communications interface 1017.

I/O interface(s) 1014 supports connectivity to external hardware 1099 such as a keyboard, display screen, repository, etc.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with controller/monitor application 140-1 (e.g., including instructions) to carry out any of the operations as discussed herein.

During operation of one embodiment, processor 1013 accesses computer readable storage media 1012 via the use of interconnect 1011 in order to launch, run, execute, interpret or otherwise perform the instructions in controller/monitor application 140-1 stored on computer readable storage medium 1012. Execution of the controller/monitor application 140-1 produces controller/monitor process 140-2 to carry out any of the operations and/or processes as discussed herein.

Those skilled in the art will understand that the computer system 1000 can include other processes and/or software and hardware components, such as an operating system that controls allocation and use of hardware resources to execute controller/monitor application 140-1.

In accordance with different embodiments, note that computer system may reside in any of various types of devices, including, but not limited to, a power supply, switched-capacitor converter, resonant power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Figure 11:
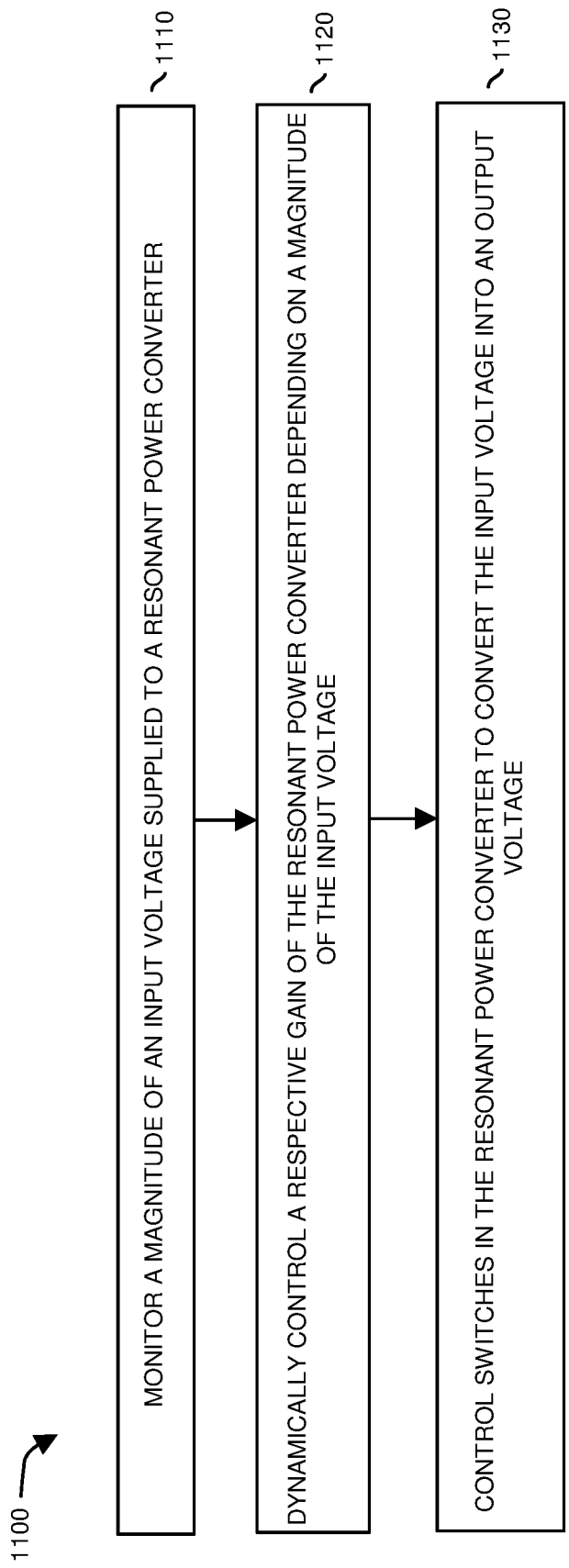
FIG. 11 is an example diagram illustrating a method according to embodiments herein.
Figure 12:
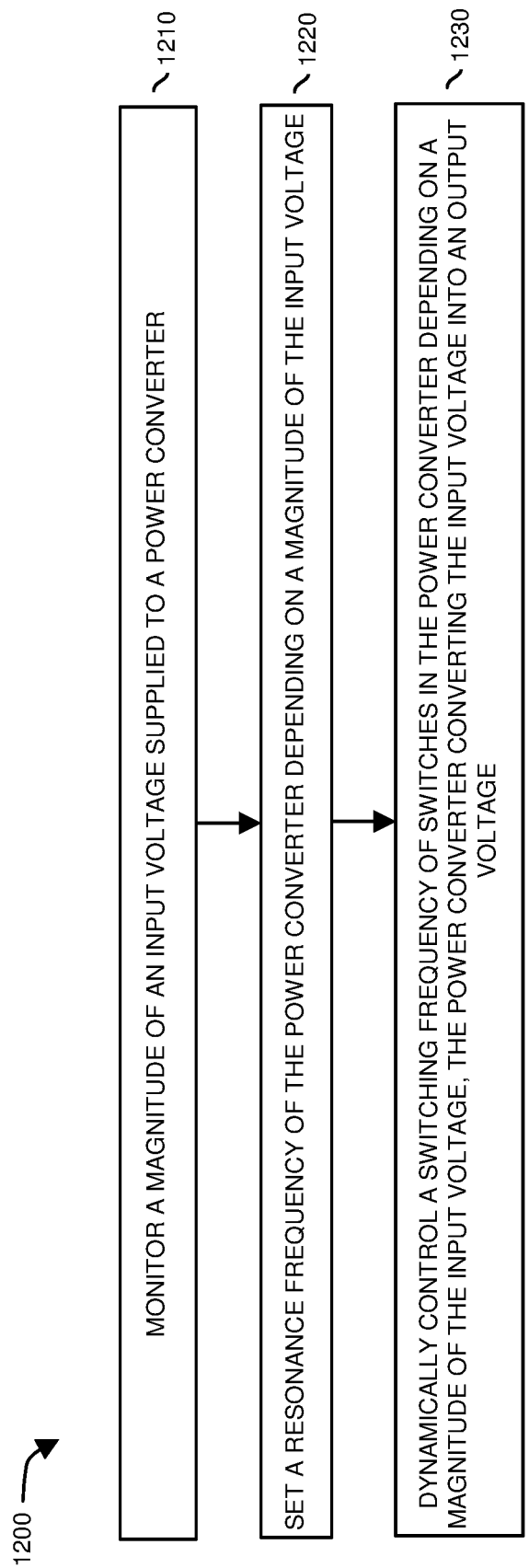
FIG. 12 is an example diagram illustrating a method according to embodiments herein.

Functionality supported by one or more resources as described herein are discussed via flowchart in FIGS. 11 and 12. Note that the steps in the flowcharts below can be executed in any suitable order.

FIG. 11 is a flowchart 1100 illustrating an example method according to embodiments herein. Note that there will be some overlap with respect to concepts as discussed above.

In processing operation 1110, the monitor resource 141 monitors a magnitude of an input voltage 120 supplied to a resonant power converter 150.

In processing operation 1120, the controller 140 dynamically controls a respective gain of the resonant power converter 150 depending on a magnitude of the input voltage 120.

In processing operation 1130, the controller 140 controls switches S1 and S2 in the resonant power converter 150 resulting in conversion of the input voltage 120 into an output voltage 120.

FIG. 12 is a flowchart 1200 illustrating an example method according to embodiments herein. Note that there will be some overlap with respect to concepts as discussed above.

In processing operation 1210, the monitor resource 141 monitors a magnitude of an input voltage 120 supplied to a power converter 150.

In processing operation 1220, the controller 140 sets a resonance frequency of the power converter 150 depending on a magnitude of the input voltage 120.

In processing operation 1230, the controller dynamically controls a switching frequency Fsw of switches S1 and S2 in the power converter 150 depending on a magnitude of the input voltage 120. The power converter converts the input voltage 120 into an output voltage 123.

Figure 13:
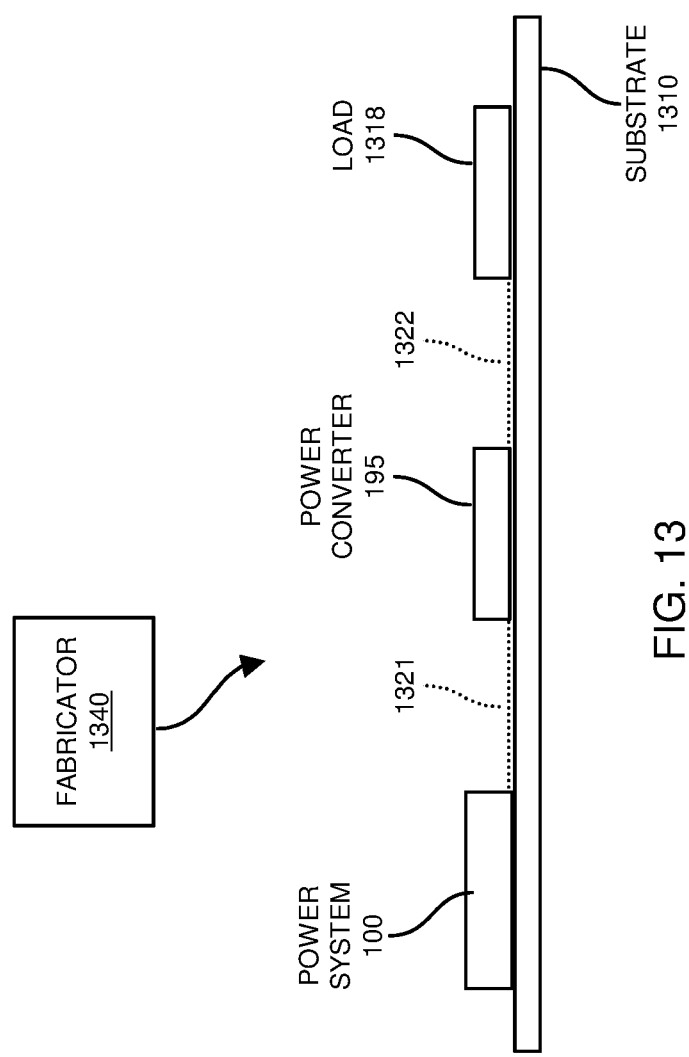
FIG. 13 is an example diagram illustrating fabrication of a circuit board including the novel power system according to embodiments herein.

FIG. 13 is an example diagram illustrating fabrication of a circuit board according to embodiments herein.

In this example embodiment, fabricator 1340: receives a substrate 1310 (such as a circuit board); affixes the power system 100 (such as a power supply and corresponding components) to the substrate 1310.

The fabricator 1340 further affixes the power converter 195 to the substrate 1310. Via circuit path 1321 (such as one or more traces, etc.), the fabricator 1340 couples the power system 100 to the power converter 195. Via circuit path 1322 (such as one or more traces, etc.), the fabricator 1340 couples the power converter 195 to a load 1318. In one embodiment, the circuit path 1321 conveys output voltage 123 generated from the power supply 100 to the power converter 195. The power converter 195 converts the received output voltage 123 into a target voltage that drives load 1318.

Accordingly, embodiments herein include a system comprising: a substrate 1310 (such as a circuit board, standalone board, mother board, standalone board destined to be coupled to a mother board, etc.); a power system 100 including a resonant power converter 150 as described herein; and a load 1318, the load 118 powered based on energy or power provided by the output voltage 123. For example, the power converter converts the output voltage 123 into a suitable secondary output voltage that powers load 1318. The load 1318 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1310.

Figure 14:
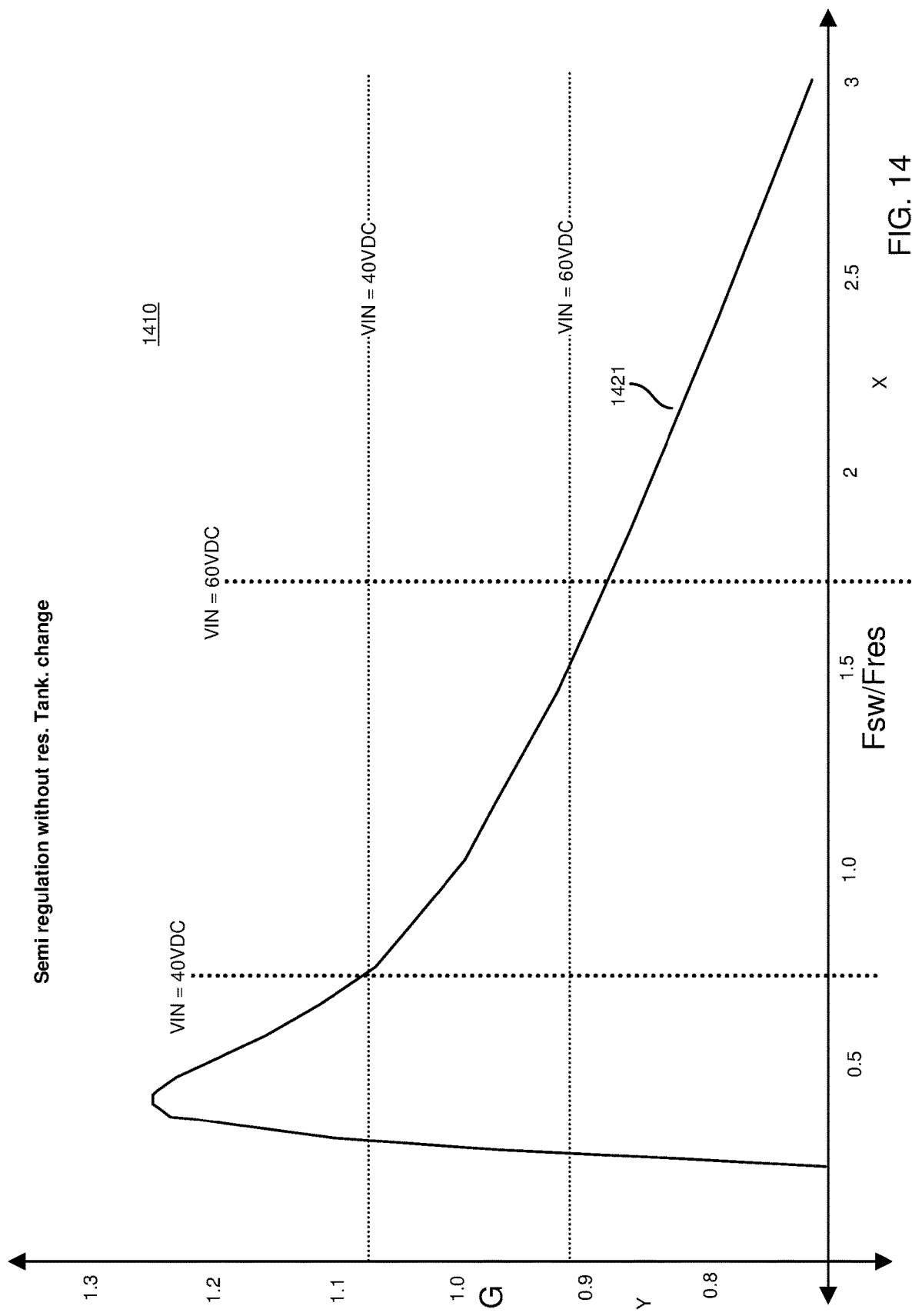
FIG. 14 is an example diagram illustrating operation of a resonant power converter in a semi-regulation mode without changing a resonant frequency according to embodiments herein.

FIG. 14 is an example diagram illustrating operation of a resonant power converter in a semi-regulation mode without changing a resonant frequency according to embodiments herein.

As shown in graph 1410, embodiments herein include implementing a single gain function 1421 (G=Gain) to provide semi regulation without changing the resonant frequency of the resonant power converter 150 based on the input voltage 120. As shown in graph 1410, the controller 140 adjusts the switching frequency (Fsw) associated with switching of switches S1 and S2 to adjust a gain of the resonant power converter 150 for different magnitudes of the input voltage 120.

Figure 15:
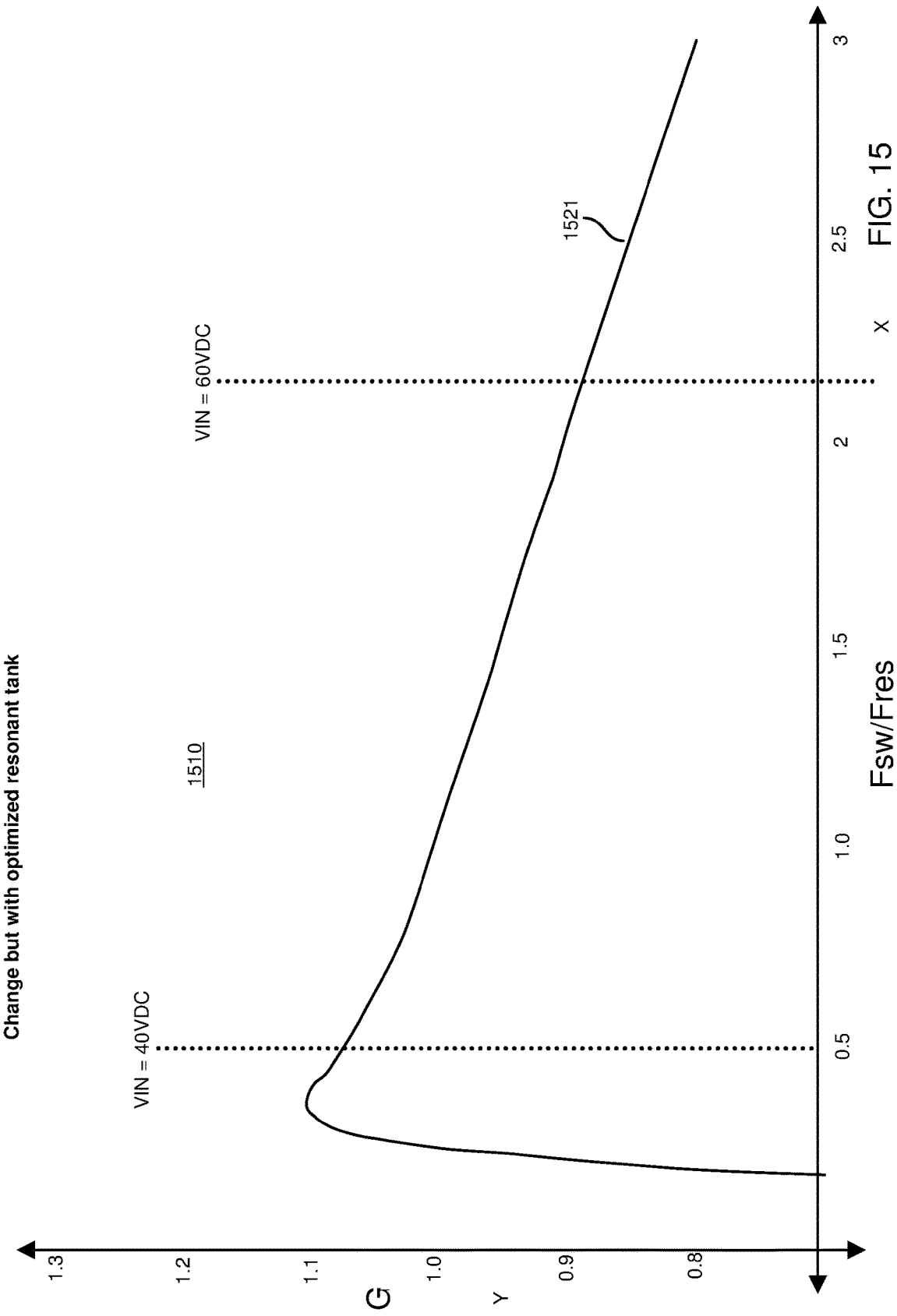
FIG. 15 is an example diagram illustrating operation of a resonant power converter in a semi-regulation mode without changing a resonant frequency but with optimized resonant tank circuit according to embodiments herein.

FIG. 15 is an example diagram illustrating operation of a resonant power converter in a semi-regulation mode without changing a resonant frequency but with optimized resonant tank circuit according to embodiments herein.

In contrast to previous FIG. 14, FIG. 15 shows an optimized resonant tank with a flatter gain curve. Such an optimization reduces the amount of resonant current in the tank and increases the efficiency of the converter.

As shown in graph 1510, embodiments herein include implementing a single gain function 1521 (optimized for input voltages between 40 and 60 VDC, G=Gain) to provide semi regulation without changing the resonant frequency of the resonant power converter 150 based on the input voltage 120. As shown in graph 1510, the controller 140 adjusts the switching frequency (Fsw) associated with switching of switches S1 and S2 to adjust a gain of the resonant power converter 150 for different magnitudes of the input voltage 120.

Figure 16:
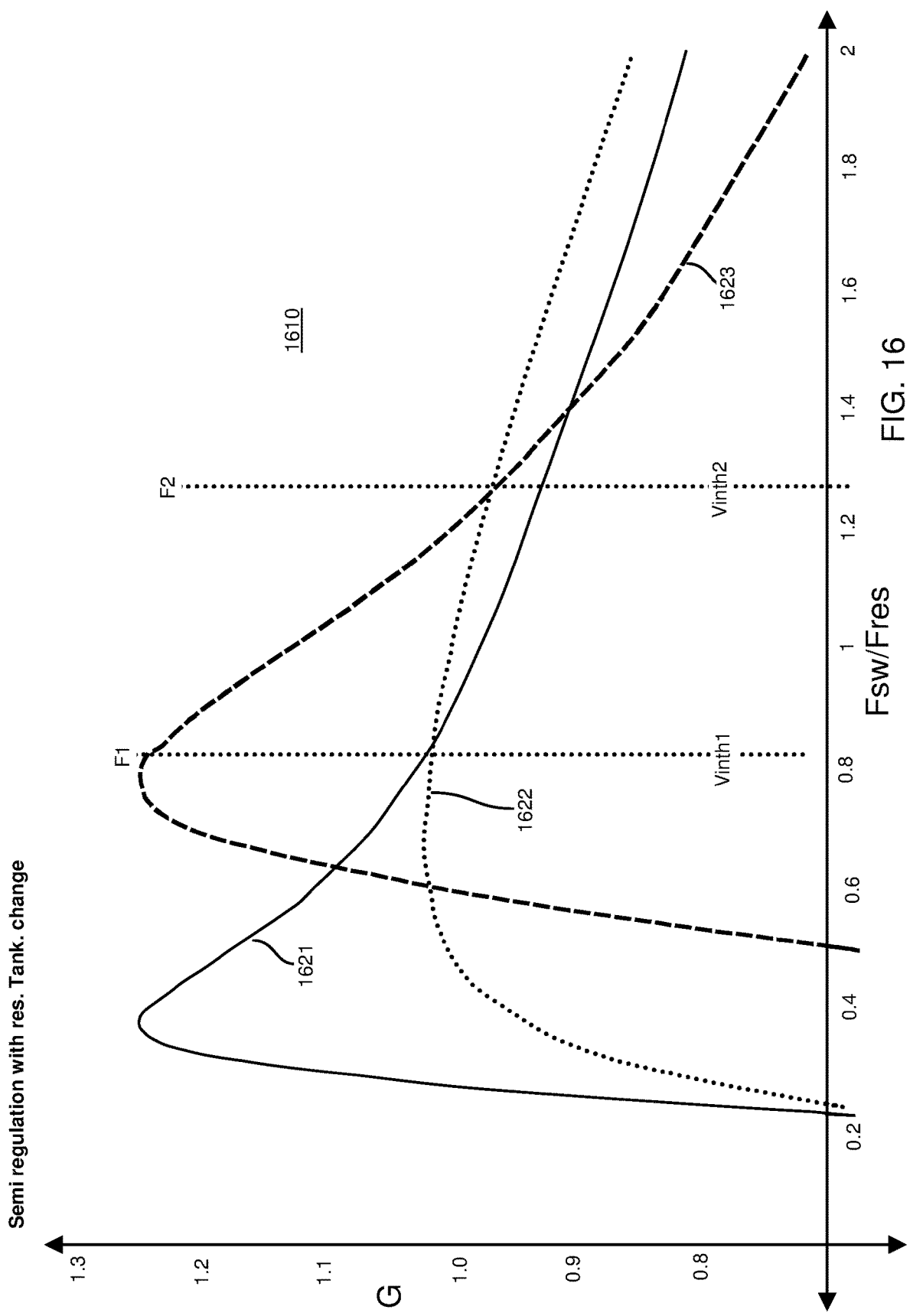
FIG. 16 is an example diagram illustrating operation of a resonant power converter in a semi-regulation mode with changes to a resonant frequency according to embodiments herein.

FIG. 16 is an example diagram illustrating operation of a resonant power converter in a semi-regulation mode with changes to a resonant frequency according to embodiments herein.

As shown in graph 1610, in a manner as previously discussed, embodiments herein include implementing different gain functions (G=Gain) over a range of different input voltages. For example, when the magnitude of the input voltage 120 is less than a threshold value Vinth1 (such as when the input voltage falls in a first range), the controller 140 sets the resonant frequency of the resonant power converter 150 to a value associated with gain function 1621; when the magnitude of the input voltage 120 is between threshold value Vinth1 and Vinth2 (such as when the input voltage falls in a second range), the controller 140 sets the resonant frequency of the resonant power converter 150 to a value associated with gain function 1622; when the magnitude of the input voltage 120 is greater than threshold value Vinth2 (such as when the input voltage falls in a third range), the controller 140 sets the resonant frequency of the resonant power converter 150 to a value associated with gain function 1623. In each of the different ranges, in a manner as previously discussed, the controller 150 adjusts the switching frequency Fsw and implements hysteresis as the input voltage changes over time.

Figure 17:
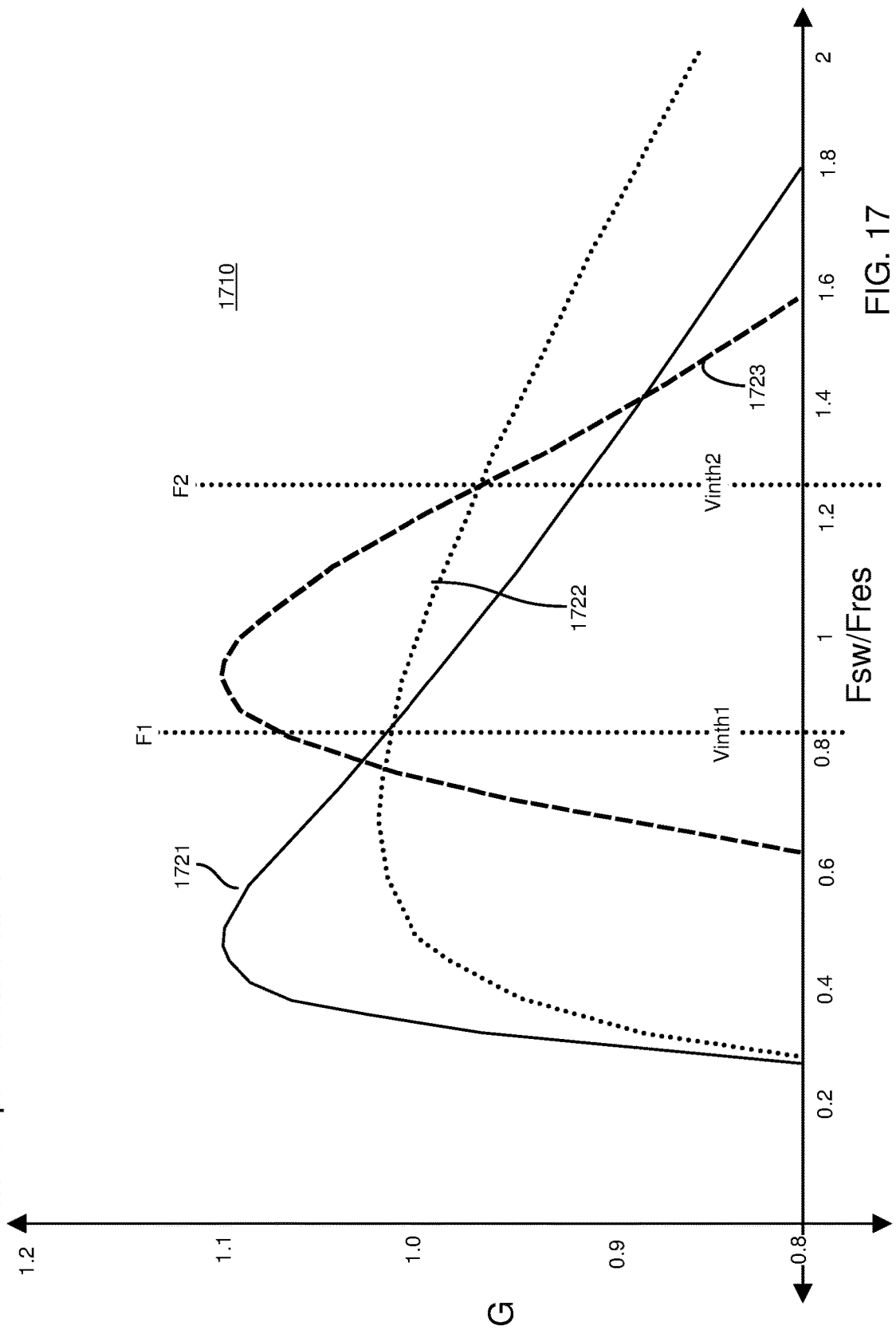
FIG. 17 is an example diagram illustrating operation of a resonant power converter in a semi-regulation mode with changes to a resonant frequency but with optimized resonant tank circuit according to embodiments herein.

FIG. 17 is an example diagram illustrating operation of a resonant power converter in a semi-regulation mode with changes to a resonant frequency but with optimized resonant tank circuit according to embodiments herein.

In contrast to previous FIG. 16, FIG. 17 shows an optimized resonant tank with a flatter gain curve. Such an optimization reduces the amount of resonant current in the tank and increases the efficiency of the converter.

As shown in graph 1710, in a manner as previously discussed, embodiments herein include implementing different optimized gain functions (G=Gain) over a range of different input voltages. For example, when the magnitude of the input voltage 120 is less than a threshold value Vinth1 (such as when the input voltage falls in a first range), the controller 140 sets the resonant frequency of the resonant power converter 150 to a value associated with gain function 1721; when the magnitude of the input voltage 120 is between threshold value Vinth1 and Vinth2 (such as when the input voltage falls in a second range), the controller 140 sets the resonant frequency of the resonant power converter 150 to a value associated with gain function 1722; when the magnitude of the input voltage 120 is greater than threshold value Vinth2 (such as when the input voltage falls in a third range), the controller 140 sets the resonant frequency of the resonant power converter 150 to a value associated with gain function 1723. In each of the different ranges, in a manner as previously discussed, the controller 150 adjusts the switching frequency Fsw and implements hysteresis as the input voltage changes over time.

Embodiments herein further include a power conversion system operative to receive a fixed or narrow range input voltage. A resonant power converter produces a wide range of varying output voltages. Such applications include but are not limited to, for example, charging batteries for electric vehicles in which the output voltage used to charge the batteries varies.

In one embodiment, the power converter as discussed herein monitors the output voltage and/or a ratio of an output voltage to input voltage instead of merely monitoring the input voltage. In case of semi-regulating power conversion, there is now a pre-regulating converter disposed in a circuit before an isolating converter instead of the post-regulating converter of the prior embodiments above. A pre-regulating converter as discussed herein, such as is in the context of battery charging, e.g., a power factor correction converter with a variable DC link voltage.

Figure 18:
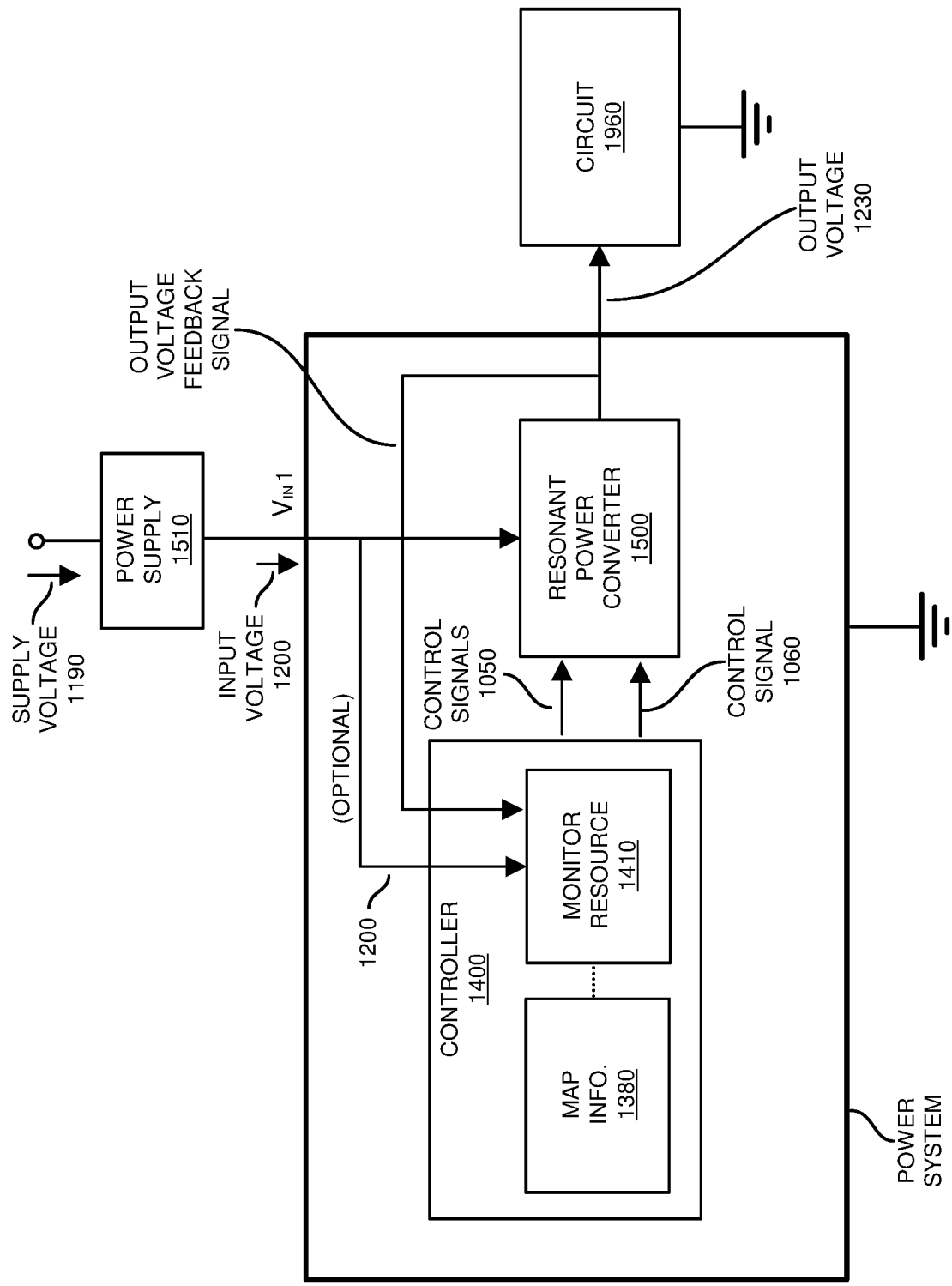
FIG. 18 is an example diagram illustrating a power supply (power system) including a resonant power converter according to embodiments herein.

FIG. 18 is an example diagram illustrating a power supply including a resonant power converter and corresponding controller according to embodiments herein.

As shown in this example embodiment, the power system 1000 (i.e., power supply) includes controller 1400 and resonant power converter 1500. In one embodiment, the power system 1000 receives an input voltage 1200 and produces an output voltage 1230.

In one embodiment, the power supply 1510 (such as a power converter) is a pre-regulating power converter providing the input voltage 1200 at a fixed voltage value or a voltage that varies within a narrow band input voltage range.

Note that embodiments herein can include piece-wise adjusting of the resonance frequency of the resonant power converter 1500 depending on a magnitude of the output voltage 1230 and/or a magnitude of the input voltage 1200, providing full regulation within each of the output voltage/input voltage regions. Embodiments herein include supplying the output voltage 1230 directly to any kind of circuit such as a load.

Note further that the resonant power converter 1500 can be any suitable type of power converter. For example, the power converter as described herein can be implemented in accordance with any isolated or non-isolated technology.

Examples of isolated power converter topologies include hard switching half bridge converters, LLC converters, phase shift ZVS (Zero Voltage Switching) converters, etc.

Examples of non-isolated topologies include buck converters, switched capacitor converters, tapped inductor switched tank converters, combination converters such as buck/switched capacitor converters, etc.

In further example embodiments, the resonant power converter 1500 is a semi-regulated bus converter or other suitable entity operative to convert the input voltage 1200 into the output voltage 1230. In such an instance, the amount and/or mode of voltage regulation provided by the controller 1400 varies depending on a magnitude of the output voltage 1230 and/or input voltage 1200. Note that further embodiments herein can include providing full regulation via a piece-wise set resonance frequency bands.

Note further that, in one embodiment, the controller 1400 further includes monitor resource 1410 and corresponding map information 1380. During operation, as previously discussed, the resonant power converter 1500 receives an input voltage 1200 and converts it into an output voltage 1230. As its name suggests, the monitor resource 1410 monitors a magnitude of the output voltage 1230 and/or the input voltage 1200. Depending on a magnitude of the output voltage 1230 and/or the input voltage 1200 (such as Vin1), the controller 1400 controls a respective one or more parameters such as gain provided by the resonant power converter 1500.

Thus, embodiments herein include adjusting a gain provided by the resonant power converter 1500 depending on a magnitude of the output voltage 1230 (a.k.a., Vout1) and/or input voltage 1200 as monitored by the monitor resource 1400.

In one embodiment, the gain associated with the resonant power converter 1500 determines the voltage conversion ratio of the resonant power converter 1500.

For example, the output voltage 1230 (i.e., Vout1), $$Vout1 = Vin * Ns1/Np1 * Gain1,$$

where Vin is the input voltage 1200, Ns1=number of turns of the secondary winding associated with the transformer T11, Np1=number of turns on the primary winding associated with the transformer T11, Gain1 is the gain provided by the resonant power converter 1500.

$$Gain1 = (Vout1/Vin) * (Np1/Ns1),$$

or more generally, Gain1=(Vout1/Vin)*Scale-Factor, where the scale factor is any suitable value chosen to convert an input voltage 1200 to a respective output voltage 1230 in a desired output voltage range.

Adjusting the gain (such as Vin1 times some scale factor) associated with the resonant power converter 1500 provides more efficient conversion of the input voltage 1200 to an output voltage 1230 for varying input voltage settings. In one embodiment, embodiments herein include operating the resonant power converter 1500 as close as possible to a gain of around 1 to maximize efficiency.

More specifically, assume that for a majority of time, the resonant power converter 1500 receives an input voltage 1200 that is close in value (such as within 5% of point) to an expected average value such as 400 VDC. In such an instance, conversion efficiency is very high. As further discussed herein, embodiments herein include controlling the resonant power converter 1500 to operate in a highly efficient low gain mode during conditions when the desired output voltage 1230 resides in a normal voltage range such as between 407 VDC and 430 VDC. When a magnitude of the output voltage falls outside this normal range (such as when the output voltage 1200 is greater than 430 VDC or less than 400 VDC), the output voltage 1230 would deviate if the resonant power converter were operated in the most efficient gain mode close to a gain of 1 associated with the normal voltage range as previously discussed.

In accordance with embodiments herein, although less efficient, in order provide better regulation of the output voltage 1230 (such as an output voltage closer to a desired target value without providing full regulation, which is less efficient), the controller 1400 operates the resonant power converter 1500 in a non-unity gain mode (where the gain is substantially higher than one or substantially lower than one when the output voltage 1230 falls outside the normal range to maintain the magnitude of the output voltage 1230 within a desired range. Further details are discussed below.

Note that the controller 1400 can be configured to control any suitable one or more control parameters of the resonant power converter 1500 to maintain the magnitude of the output voltage 1230 within a desired range. The power system 1000 supplies the output voltage 1230 to any suitable circuit 1960 such as load, power converter, etc., which further converts the output voltage 1230 into a highly regulated supply voltage that powers a load. In one embodiment, the output voltage 1230 is used to power a circuit 1960 such as to charge a battery.

In one embodiment, depending on the magnitude of the output voltage 1230, the controller 1400 dynamically controls parameters such as: i) a switching frequency Fsw1 of switches in the resonant power converter, ii) a resonant frequency of the resonant power converter 1500, etc.

Dynamic control of the switching frequency and/or the resonant frequency operation associated with the resonant power converter 1500 maintains a magnitude of the output voltage 1230 within a desired voltage range, closer to a desired target DC voltage value.

Note further that embodiments herein optionally include producing map information 1380. When implemented, the map information 1380 provides a mapping between the magnitude of the input voltage 1200 and a setting of the switching frequency applied to one or more switches in the resonant power converter 1500. Thus, via the map information 1380, as further discussed herein, the controller 1400 maps a desired magnitude of the output voltage 1230 to a resonant frequency value and sets the resonant frequency operation of the resonant power converter 1500 to the resonant frequency value.

Additionally, or alternatively, the controller 1400 maps the current magnitude of the desired output voltage 1230 to an appropriate switching frequency value, Fsw1. The controller 140 then sets the switching frequency of the resonant power converter 1500 to that switching frequency value, Fsw1.

Figure 19:
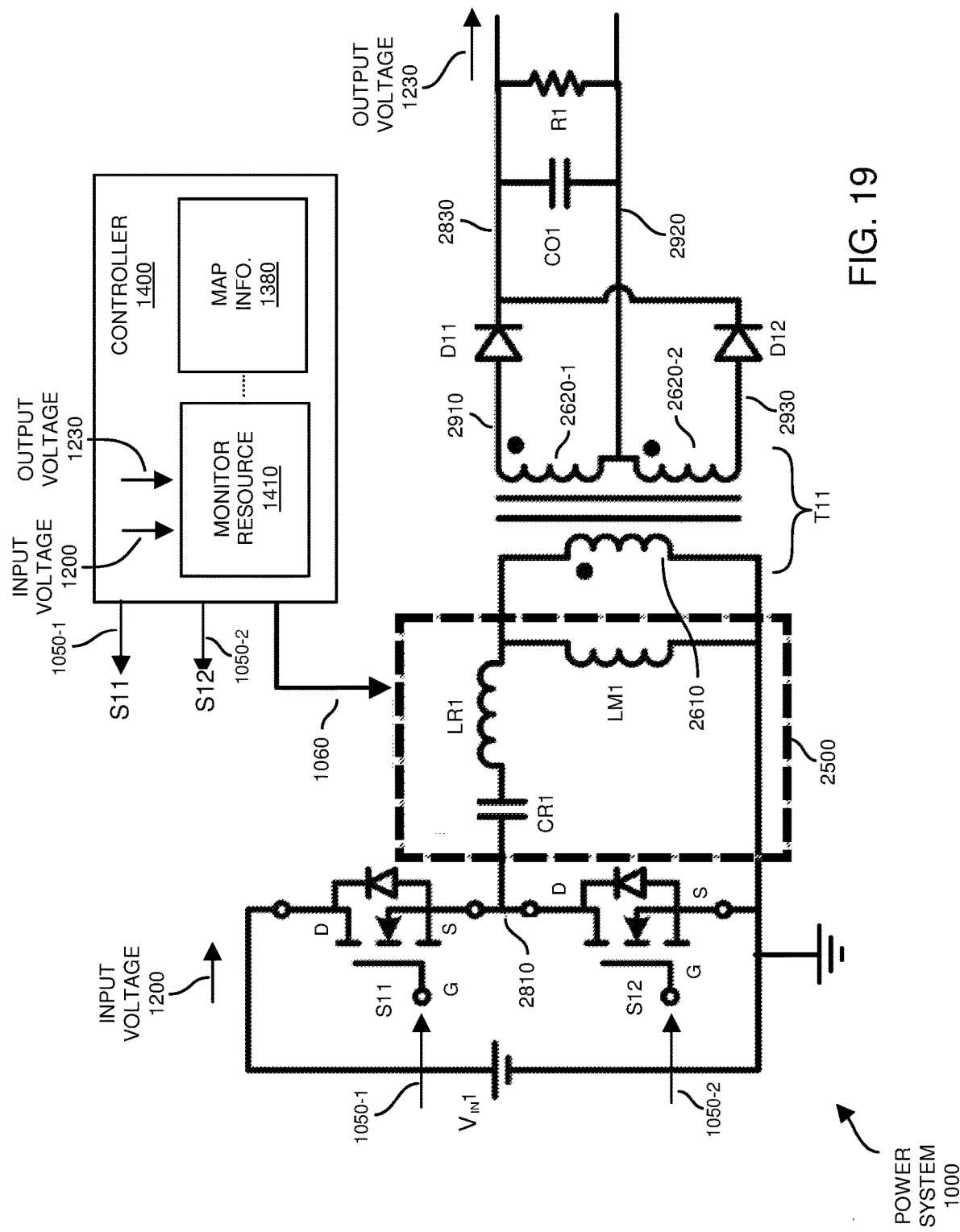
FIG. 19 is an example diagram illustrating details of a resonant power converter and a corresponding controller according to embodiments herein.

FIG. 19 is an example diagram illustrating details of a resonant power converter and a corresponding controller according to embodiments herein.

As shown, the power system 1000 includes controller 1400, input voltage source Vin1, switches S11 and S12, capacitor Cr1, inductor Lr1, transformer T11 (such as a tapped-transformer), diode D11, diode D12, capacitor Co1, and resistor R1.

As previously discussed, the controller 1400 includes monitor resource 1410 and map information 1380.

Further in this example embodiment, as shown, the switches S11 and S12 are coupled in series between the input voltage source Vin1 and corresponding ground reference. For example, the drain node (D) of the switch S11 is coupled to the input voltage source Vin1. At node 2810, the source node (S) of switch S11 is coupled to the drain node (D) of switch S12 as well as a corresponding node of capacitor Cr1.

The source node (S) of switch S12 is coupled to the ground reference voltage.

The controller 1400 is coupled to supply the control signal 1050-1 to the gate node (G) of switch S11; the controller 1400 is coupled to supply the control signal 1050-2 to the gate node (G) of switch S12.

As further shown, resonant circuit 2500 such as the combination of the capacitor Cr1, inductor Lr1, and primary winding 2610 of the transformer T11 are connected in series between node 2810 and ground. Inductor Lm1 represents the magnetizing inductance associated with the primary winding 2610 of transformer T11.

The primary winding of T11 is magnetically coupled to both secondary winding 2620-1 and secondary winding 2620-2. If desired, node 2920 (such as tap associated with the transformer T11) can be connected to ground. Each of the primary winding 2610 and secondary windings 2620 can include any suitable number of turns. In one nonlimiting example embodiment, the windings include an appropriate number of turns such that the resonant power converter 1500 converts, on average, an input voltage 123 of 400 VDC (or other suitable magnitude) into an output voltage 1230 of between 350-525 VDC or other suitable value, although the resonant power converter 1500 can be configured to provide any suitable voltage conversion.

Yet further, diode D11 is connected between the node 2910 of the transformer T11 and the output voltage node 2830. Diode D12 is connected between the node 2930 of the transformer T11 and the output voltage node 2830.

Finally, capacitor Co1 is coupled between the output voltage node 2830 in the node 2920. Resistor R1 is connected between the output voltage node 2830 and the node 2920.

Thus, in this example embodiment shown, the resonant power converter 150 includes a first switch S11 and a second switch S12.

During operation, the controller 1400 controls switching of the first switch S11 to selectively apply a first voltage (such as the input voltage 1200) to an input (node 2810) of the resonant circuit 2500 of the resonant power converter 1500; the controller 1400 controls switching of the second switch S12 to selectively apply a second voltage (such as a ground reference voltage with respect to the input voltage) to the input (node 2810) of the resonant circuit 2500 of the resonant power converter circuit 1500.

In accordance with further embodiments, switching of the switches S11 and S12 during each of multiple control cycles includes a first switch setting of activating the switch S11 (providing a low resistive path between respective source and drain nodes) for a duration of time while switch S12 is deactivated (providing a high resistive path). Switching of the switches S11 and S12 during each of multiple control cycles further includes a second switch setting such as activating the switch S12 (providing a low resistive path between respective source and drain nodes) for a duration of time while switch S11 is deactivated (providing a high resistive path). The controller 1400 repeatedly switches between the first switch setting and the second switch setting to convert the input voltage 1200 into the output voltage 1230.

As previously discussed, the map information 1380 provides a mapping between the magnitude of the output voltage 1230 and a setting of the resonant frequency associated with operating the resonant power converter 1500. Thus, via the map information 1380, the controller 1400 maps the current magnitude of the output voltage 1230 to a resonant frequency value and sets the resonant frequency operation of the resonant power converter 1500 (specifically resonant circuit 2500) to the selected resonant frequency value.

In one embodiment, control or setting of the resonant frequency associated with the resonant circuit 2500 can be achieved in any suitable manner. For example, any of one or more components capacitor Cr1, inductor Lr1, and inductor Lm1 can be adjusted to change a resonant frequency of the resonant circuit 2500.

Additionally, or alternatively, as further discussed herein, the controller 1400 maps the current magnitude of the output voltage 1230 to a switching frequency value, Fsw1, associated with controlling switches S11 and S12. For example, the controller 1400 sets the switching frequency (Fsw1) of producing the control signals 1050-1 and 1050-2 of the resonant power converter 1200 to the selected switching frequency value (Fsw1).

Again, in one embodiment, the gain associated with the resonant power converter 1500 determines the voltage conversion ratio of the LLC (together with the transformer T11 turn ratio).

For example, the output voltage 1230 (i.e., Vout1), $$Vout1 = Vin1 * Ns1/Np1 * Gain1,$$

where Vin1 is the input voltage 1200, Ns1=number of turns of the secondary winding associated with the transformer T11, Np1=number of turns on the primary winding associated with the transformer T11, Gain1 is the gain provided by the resonant power converter 1500.

$$Gain1 = (Vout1/Vin1) * (Np1/Ns1)$$

Figure 20:
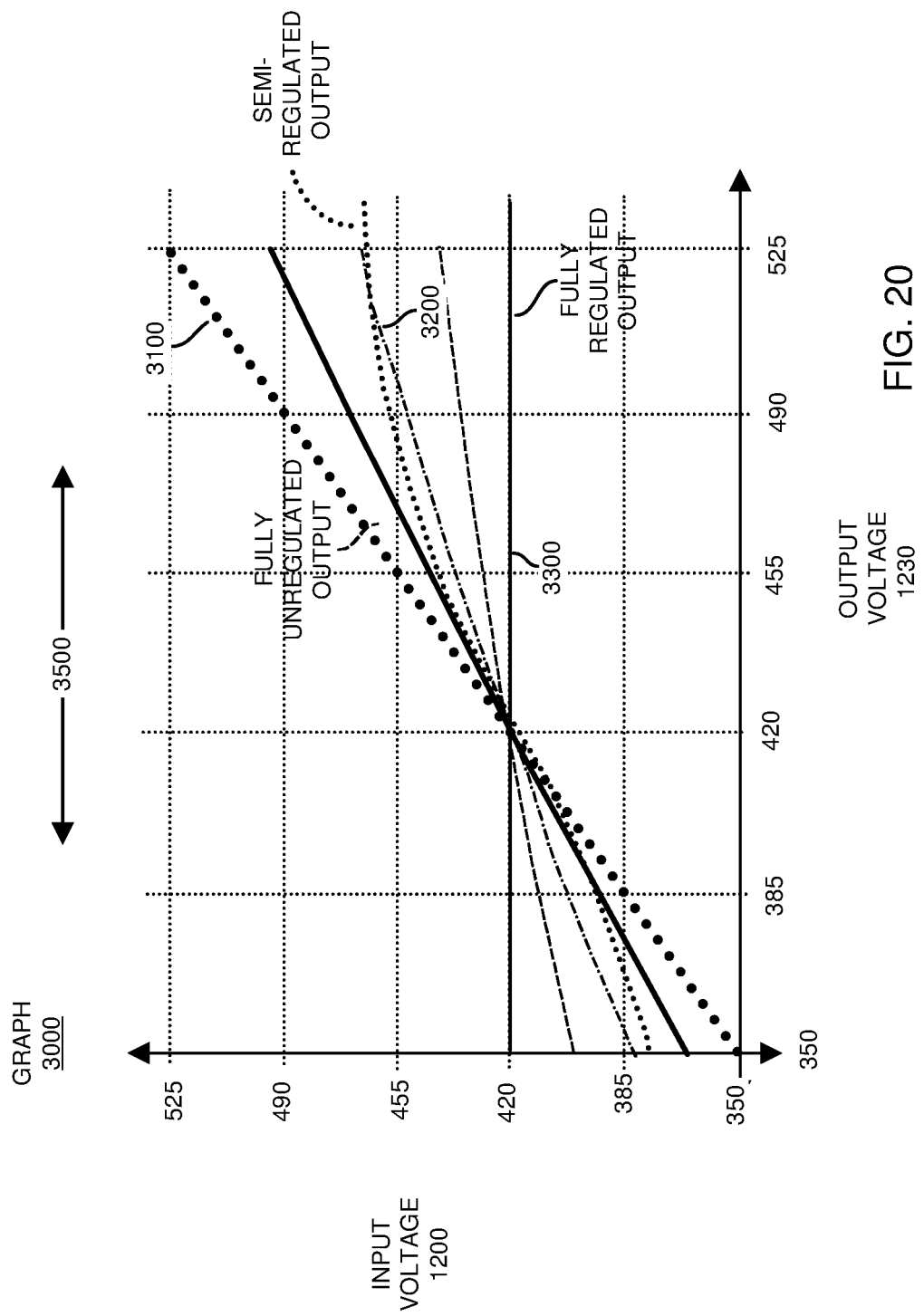
FIG. 20 is an example graph illustrating a magnitude of an output voltage over a range of different magnitudes of an input voltage according to embodiments herein.

FIG. 20 is an example graph illustrating operation of a resonant power converter over a range of different magnitudes of input voltage according to embodiments herein.

Assume in this example embodiment that the transformer T11 is configured with a winding ratio of primary winding: secondary winding being 1:1.

In one embodiment, note that the resonant power converter 1500 operates in a semi-regulating manner. The resonant power converter 1500 receives an input voltage 1200 falling within a narrow range input voltage band. In graph 3000, based on an input voltage 1200 between 380V to 460V, the resonant power converter produces a wide output voltage ranging from 350V to 525V. In one embodiment, a fixed regulated converter receives in this example, a fixed voltage of 420V to produce the same output voltage range (350-525). In one nonlimiting example embodiment, the resonant power converter as discussed herein operates far away from its resonance frequency and therefore operates at a less efficient operation point.

Note further that a non-regulating resonant power converter would (such as transformer ratio 1:1) require an input voltage band of 350V to 525V to produce the above mentioned band of output voltage to follow the battery voltage depending on state-of-charge. A pre-regulating converter such as a Power factor correction stage would have difficulties to regulate to 350V as this voltage is too close to the peak of an AC input voltage at 230V. Furthermore, the power factor correction stage would need power semiconductor devices rated at a higher voltage class than 650V in order to be able to regulate to 525V. Also, the subsequent power converter would need e.g. 800V rated power semiconductors. Such a system would have therefore a higher system cost.

Conventional techniques include implementation of function 3100 or function 3300 to generate a respective output voltage 1230. For example, when the conventional power converter function 3300 (full regulation) is implemented to convert an input voltage 1200 into an output voltage 1230, the output voltage 1230 is a constant target voltage (such as 400 VDC) regardless of a magnitude of the input voltage 1200. When the function 3100 (fully unregulated mode) is implemented to convert an input voltage 1200 into an output voltage 1230, the output voltage 1230 linearly varies depending on a magnitude of the input voltage 1200.

As further discussed herein, in contrast to conventional techniques, the controller 1400 is operative to provide semi-regulated control (mode 3200) of converting the input voltage 1200 into the output voltage 1230, the semi-regulated control operated between a fully unregulated operational mode (3100) and a fully regulated operational mode (3300).

Embodiments herein include implementation of an advanced transfer function 3200 (semi-regulated output) as shown in graph 3000. In this case, the resonant power converter would provide little to no regulation in a central band 3500 of output voltage values, while providing semi-regulation both at the upper end (such as output voltages greater than band 3500) and lower end (such as output voltages less than band 3500) of the full output voltage range between 350 and 525 VDC. In this case, operation of a power converter 1500 as described herein in band 3500 provides high efficiency, which is operation for a majority of time in which the resonant power converter 1500 converts the input voltage 1200 into the output voltage 1230. Operation outside the band 3500 is slightly less efficient, providing better regulation of the output voltage 1230 than does the fully unregulated function 3100.

Accordingly, embodiments herein include providing varying degrees of regulation depending on a magnitude of the output voltage 1230 and which of multiple different output voltage ranges the magnitude falls. In one embodiment, the term degrees of regulation means how fast gain is adjusted as a function of varying output voltage, if the output voltage happens to vary.

Figure 21:
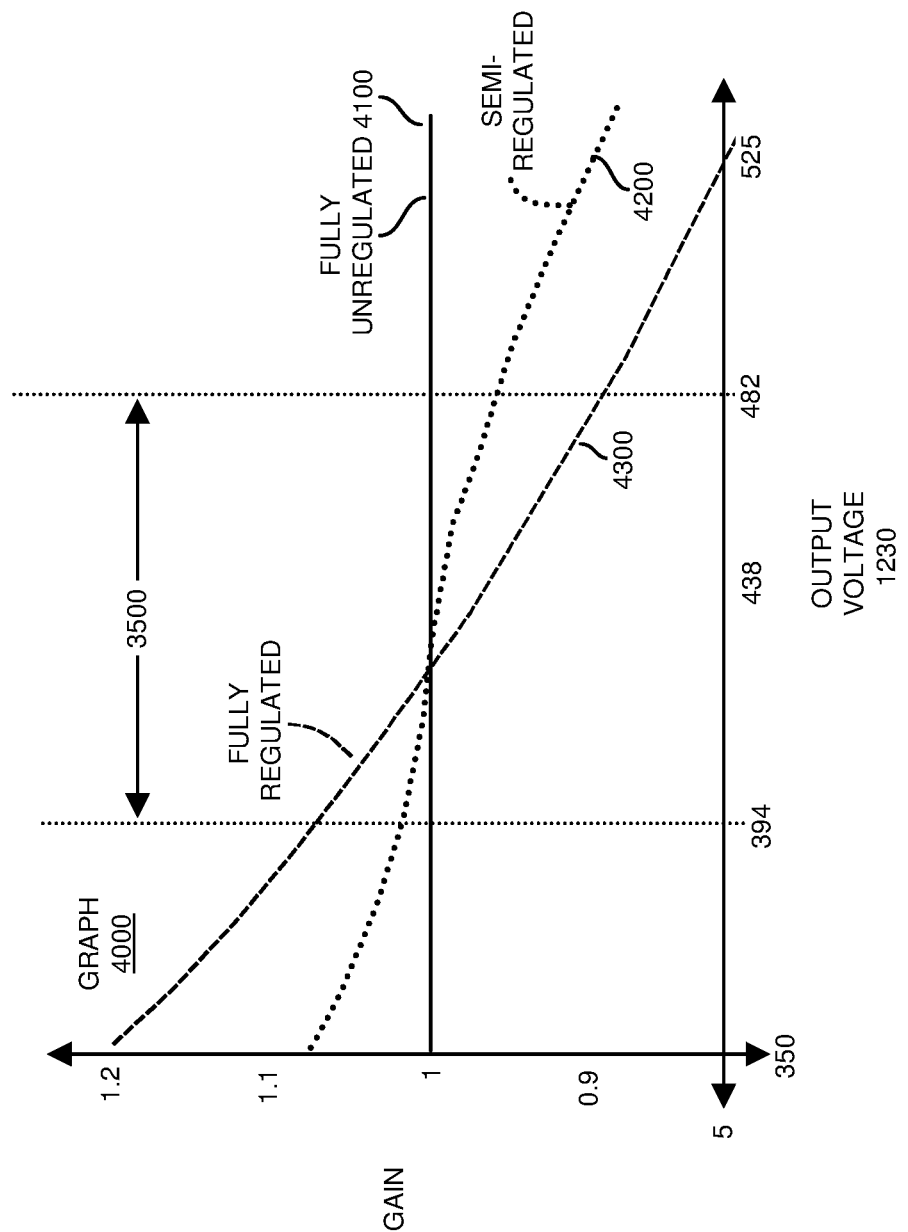
FIG. 21 is an example graph illustrating a gain of a resonant power converter over a range of different magnitudes of an output voltage according to embodiments herein.

FIG. 21 is an example graph illustrating operation of a resonant power converter over a range of different magnitudes of input voltage according to embodiments herein.

Graph 4000 illustrates example gain 4200 associated with the resonant power converter 1500 over a range of different output voltage values such as between 350 VDC and 525 VDC. As shown, gain 4200 falls between gain 4100 associated with a fully unregulated power converter and gain 4300 associated with a fully regulated power converter.

Figure 22:
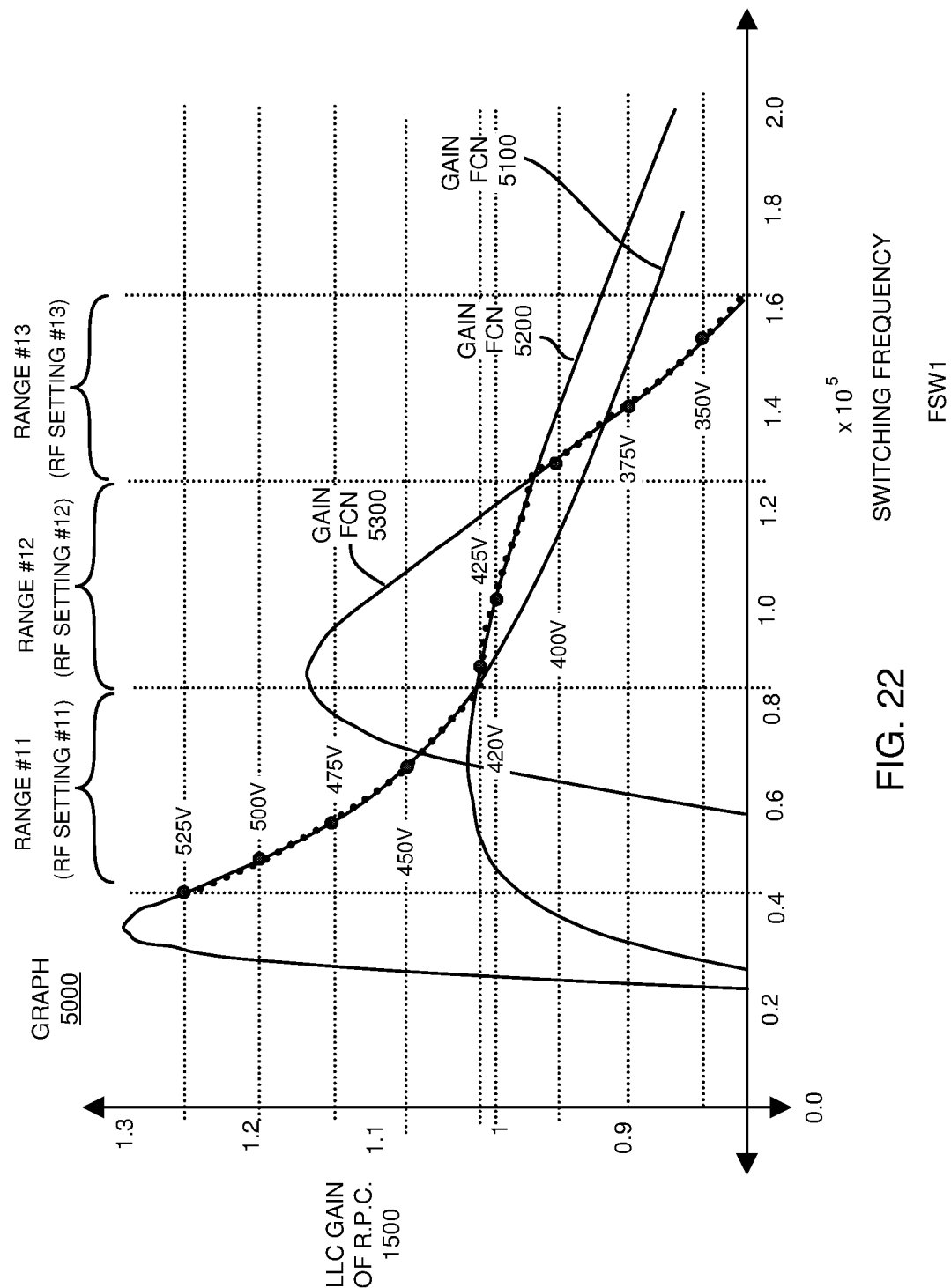
FIG. 22 is an example graph illustrating gain functions associated with different resonant frequency settings of a resonant power converter over a range of different magnitudes of an output voltage according to embodiments herein.

FIG. 22 is an example graph illustrating operation of a resonant power converter over a range of different magnitudes of output voltage according to embodiments herein.

Further embodiments herein include splitting the input voltage range (such as between 350 VDC and 525 VDC) associated with the resonant power converter 1500 into any number of ranges. In this example embodiment, the output voltage range associated with the resonant power converter 1500 is split into multiple ranges such as range #11, range #12, range #13.

Yet further embodiments herein include assigning each of the multiple voltage ranges a different resonant frequency setting. In such an instance, the resonant power converter 1500 provides a different gain function when converting the input voltage 1200 into an output voltage 1230.

Note that embodiments herein include not only adjusting the resonant frequency setting. For example, embodiments herein include adjusting the gain function as shown in FIG. 22. This typically includes changing the ratio of Lr1/Lm1 of the resonant power converter. In one embodiment, there are three different operating ranges with distinctly different gain functions.

For example, for a first resonant frequency RF #11 (such as corresponding to operation of the resonant power converter 1500 at a first resonant frequency value) of the resonant power converter 1500, the resonant power converter 1500 provides gain as indicated by gain function 5100 over different magnitudes of the output voltage 1230.

For a second resonant frequency setting RF #12 (such as corresponding to operation of the resonant power converter 1500 at a second resonant frequency value) of the resonant power converter 1500, the resonant power converter 1500 provides gain as indicated by gain function 5200 over different magnitudes of the output voltage 1230.

For a third resonant frequency setting RF #13 (such as corresponding to operation of the resonant power converter 1500 at a third resonant frequency value) of the resonant power converter 1500, the resonant power converter 1500 provides gain as indicated by gain function 5300 over different magnitudes of the output voltage 1230.

As previously discussed, the resonant frequency of the resonant power converter 1500 can be adjusted via adjusting settings of the resonant circuit 2500. For example, via control signal 1060 (one or more control signals), adjustment of the resonant frequency of the resonant power converter 1500 can include any suitable technique such as one or more of the following: adjusting a magnitude of capacitance provided by resonant capacitor component (such as capacitor Cr1) associated with the resonant circuit 2500 associated with the resonant power converter 1500, adjusting a magnitude of inductance provided by the resonant inductor component (such as inductor Lr1) associated with the resonant circuit 2500, etc.

Adjusting the magnitude of the capacitance (Cr1) associated with the resonant power converter 1500 can include selectively coupling a number of capacitors in parallel.

As further shown, the graph 5000 illustrates how the gain provided by the resonant power converter 1500 changes based on different settings of the switching frequency Fsw1 used by the controller 1400 to produce the control signals 1050 driving gates of respective switches S11 and S12.

Figure 23:
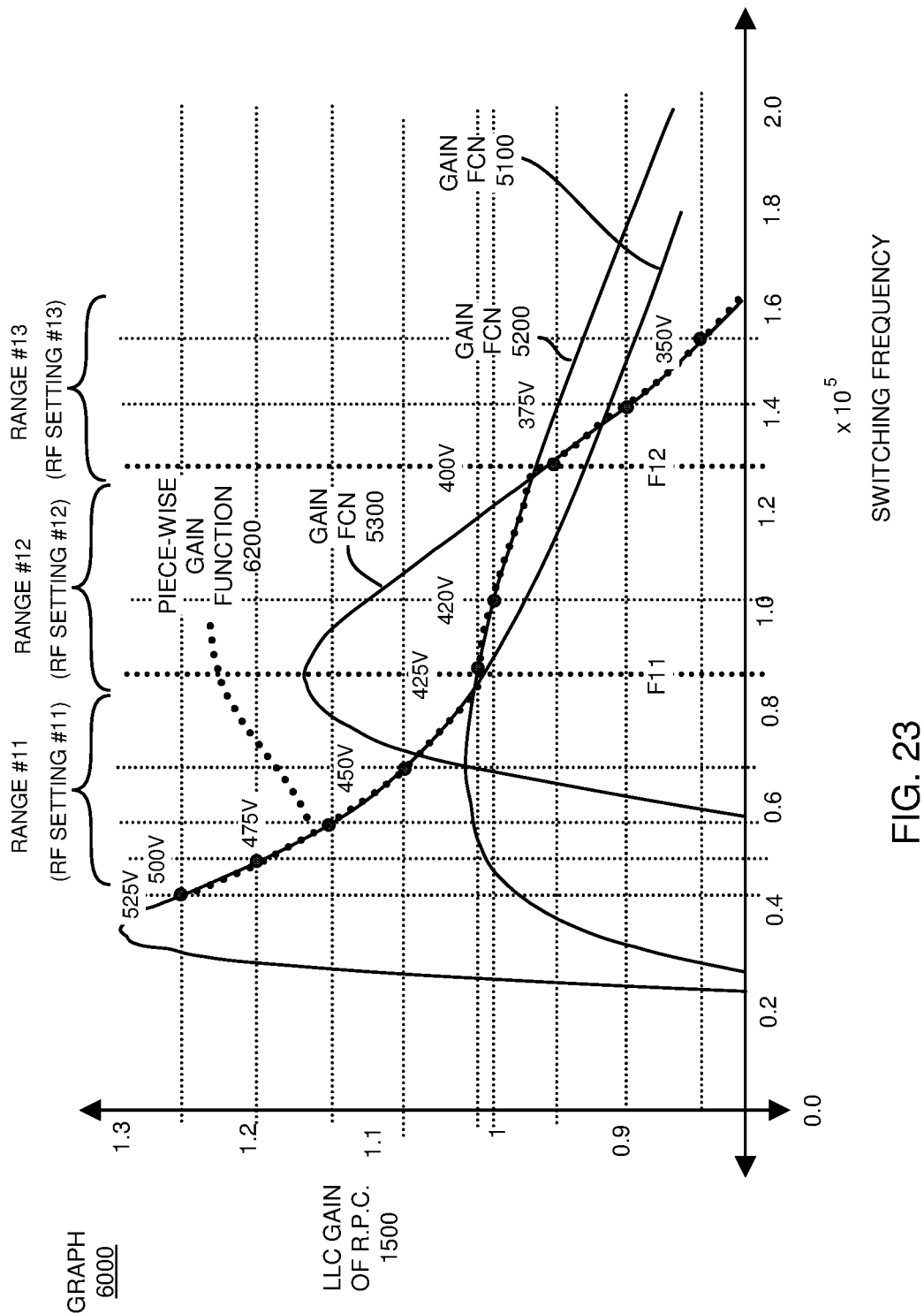
FIG. 23 is an example graph illustrating a attributes of a piece-wise gain function over a range of different magnitudes of an input voltage according to embodiments herein.

FIG. 23 is an example graph illustrating operation of a resonant power converter over a range of different magnitudes of output voltage according to embodiments herein.

As previously discussed, the output voltage range such as between 350 VDC and 525 VDC can be split up into multiple ranges including range #11, range #12, and range #13.

Each output voltage range is assigned a different resonant frequency setting. For example, the first output voltage range #11 is assigned a first resonant frequency setting RF setting #11 of resonant power converter 1500; the second output voltage range #12 is assigned a second resonant frequency setting RF setting #12 of resonant power converter 1500; the third output voltage range #13 is assigned a third resonant frequency setting RF setting #13 of resonant power converter 1500.

The controller 1400 uses each of the resonant frequency settings associated with the different ranges and the switching frequency Fsw1 to control operation of the resonant power converter 1500. In such embodiments, a gain of the resonant power converter 1500 is a piece-wise gain function 6200 including a combination of: i) a first gain function such as a portion of gain function 5100 in range #11, ii) a second gain function such as a portion of gain function 5200 in range #12, and iii) a third gain function such as a portion of gain function 5300 in range #13.

In this example embodiment, the piece-wise gain function 6200 in graph 6000 illustrates how the magnitude of the first gain function 5100 and a magnitude of the second gain function 5200 is substantially equal at a transition frequency F11 between the first output voltage range (range #11) and the second output voltage range (range #12). Additionally, the magnitude of the second gain function 5100 and a magnitude of the third gain function 5300 is substantially equal at a transition frequency F12 between the second output voltage range (range #12) and the third output voltage range (range #13).

As previously discussed, embodiments herein include implementing hysteresis when transition from using one gain function to the next. For example, when operating in range #12, the controller 1400 does not switchover to using range #11 until the output voltage is less than a threshold value F11. After operating in range #11, the controller does not switchover to operating in the range #12 again until the output voltage is greater than the threshold value plus an offset value.

Note that, fundamentally, a piece-wise defined gain function as shown in FIG. 23 is compatible both with a full regulation approach and with a semi-regulated approach as shown in FIG. 20. Embodiments herein can include full regulation with piece-wise adjustable gain function and semi-regulated approach with or without piece-wise adjusted gain function.

FIG. 24 is an example diagram illustrating map information used to control operation of a resonant power converter according to embodiments herein.

Map information 1380 indicates settings of the resonant power converter 1500 for each of different output voltage magnitudes. For example, in accordance with the piece-wise function 6200, map information 1380 indicates to: i) set the resonant frequency of the resonant circuit 2500 to resonant frequency setting #11 (RF 11) for instances in which the magnitude of the output voltage 1230 falls within the first output voltage range #11 (between 430 VDC and 525 VDC), ii) set the resonant frequency of the resonant circuit 2500 to resonant frequency setting #12 for instances in which the magnitude of the output voltage 1230 falls within the second output voltage range #12 (between 410 VDC and 430 VDC), and iii) set the resonant frequency of the resonant circuit 2500 to resonant frequency setting #13 for instances in which the magnitude of the output voltage 1230 falls within the third output voltage range #13 (between 350 VDC and 407 VDC).

As previously discussed, via control signal 1060 outputted from the controller 1400 (FIG. 19), setting of the resonant frequency associated with the resonant circuit 2500 can include controlling settings of any suitable components (such as capacitors, windings, inductance, windings, etc.) in the resonant circuit 2500.

As further shown, the map information 1380 provides, for each output voltage range, a mapping of a magnitude of the output voltage to a corresponding switching frequency setting to be applied to the control signals 1050 so that the resonant power converter 1500 provides appropriate gain to convert the input voltage 1200 to the output voltage 1230.

More specifically, referring again to FIG. 19, during operation, the controller 1400 determines a voltage range (of the multiple voltage ranges) in which the magnitude of the output voltage 1230 resides and applies an appropriate resonant frequency setting.

Assume that the monitor resource 1410 detects that the magnitude of the output voltage is 525 VDC. In such an instance, the controller 1400 detects that 525 VDC falls within the first range #11. The controller 1400 then applies the corresponding resonant frequency setting #11 (RF 11) associated with range #11 to the resonant circuit 2500. The controller 1400 further maps 525 VDC to a switching frequency of 0.47×RF 11 (where RF 11 is associated with range #11) and applies this resulting switching frequency 0.47×RF 11 to the control signals 1050.

As previously discussed, the magnitude of the output voltage 1230 may change over time. Assume that the monitor resource 1410 detects that the magnitude of the output voltage 1230 is 425 VDC. In such an instance, the controller 1400 detects that 425 VDC falls within the second range #12. The controller 1400 then applies the corresponding resonant frequency setting #12 (RF 12) associated with range #12 to the resonant circuit 2500. The controller 1400 further maps 425 VDC to a switching frequency of 0.88×RF 12 and applies this switching frequency to the control signals 1050. In one embodiment, this is a point of optimal conversion efficiency associated with conversion of the input voltage 1200 to the output voltage 1230.

Sometime later, assume that the monitor resource 1410 detects that the magnitude of the output voltage is 375 VDC. In such an instance, the controller 1400 detects that 375 VDC falls within the range #13. The controller 1400 then applies the corresponding resonant frequency setting #13 (RF 13) associated with range #13 to the resonant circuit 2500. The controller 1400 further maps 375 VDC to a switching frequency of 1.18×RF 13 and applies this switching frequency to the control signals 1050.

As previously discussed, operating in range #11 and range #13 may provide less efficient conversion than operating in the range #12. However, the operation in range #11 and range #13 provides appropriate gain such that a magnitude of the output voltage 123 is maintained closer to a desired target value.

Note further that the controller 1400 can be configured to control the resonant frequency and/or switching frequency of the resonant power converter 1500 based on a ratio of the magnitude of the output voltage 1230 to a magnitude of the input voltage 1200. For example, the controller 1400 can be configured to receive a first value indicating a magnitude of the output voltage 1230 and a second value indicating a magnitude of the input voltage 1200. The controller produces a ratio value of the first value divided by the second value. The controller 1400 uses the generated ratio value to identify a resonant frequency value in which to set the resonant power converter 1500 and then derive a switching frequency from based on multiplying an adjustment factor associated with the magnitude of the ratio value by the identified resonant frequency value.

Figure 25:
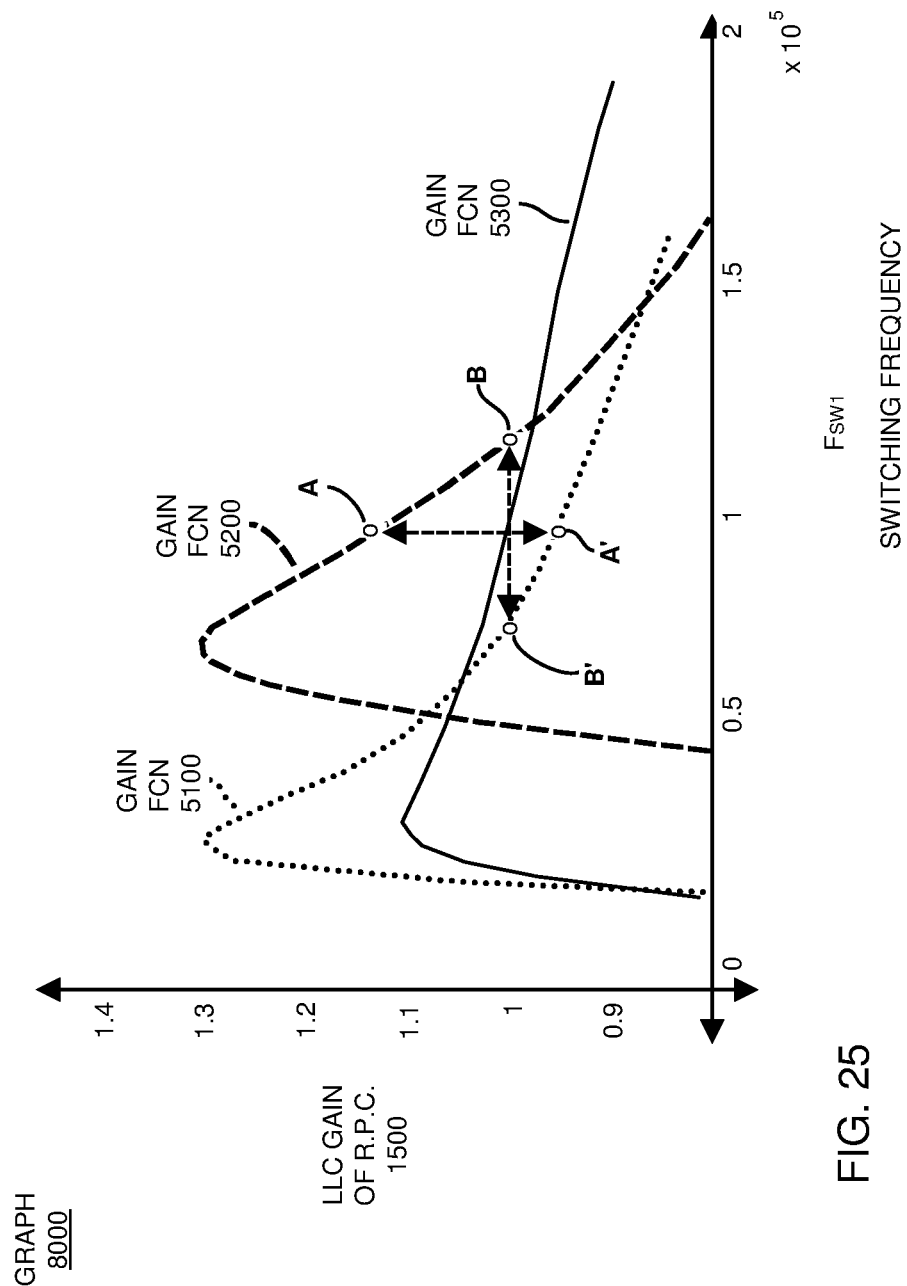
FIG. 25 is an example diagram illustrating adjustment of a switching frequency and/or a gain of a resonant power converter according to embodiments herein.

FIG. 25 is an example diagram illustrating adjustment of a switching frequency and/or a gain of a resonant power converter according to embodiments herein.

According to further embodiments herein, the controller 1400 can be configured to change either the resonant frequency associated with the resonant circuit 2500 or switching frequency Fsw1 to control the operation of the resonant power converter 1500.

For example, assume that the controller 1400 initially operates the resonant power converter at a resonant frequency setting #12 and switching frequency of around 150 KHz as indicated by the operating point A in graph 8000. In such an instance, to change the gain associated with the resonant power converter 1500, the controller 1400 adjusts the resonant frequency of the resonant power converter 1500 from gain function 5200 to gain function 5100 (associated with resonant frequency setting #11) as indicated by the operating point A' while the switching frequency is set to a fixed value such as 150 KHz.

Accordingly, while a magnitude of the switching frequency is set to a fixed value such as 150 KHz, the controller 1400 can be configured to vary a magnitude of the resonant frequency of the resonant power converter 1500 (such as from resonant frequency setting #12 to resonant frequency setting #11 or other suitable settings) to control a respective gain of the resonant power converter 1510 and conversion of the input voltage 1200 to the output voltage 1230.

As another example, assume that the controller 1400 initially operates the resonant power converter at a resonant frequency setting #12 (associated with gain function 5200) and switching frequency of around 182 KHz as indicated by the operating point B. In such an instance, to maintain the gain associated with the resonant power converter 1500 to be fixed, as indicated by the operating point B'(gain function 5100), the controller 1400: i) adjusts the resonant frequency of the resonant power converter 1500 to resonant frequency setting #11, and ii) adjusts the switching frequency from 182 KHz to 115 KHz.

Accordingly, embodiments herein include modifying one or both the resonant frequency of the resonant circuit 2500 and a switching frequency Fsw1 of the resonant power converter 1500 to maintain the gain at a constant value.

Figure 26:
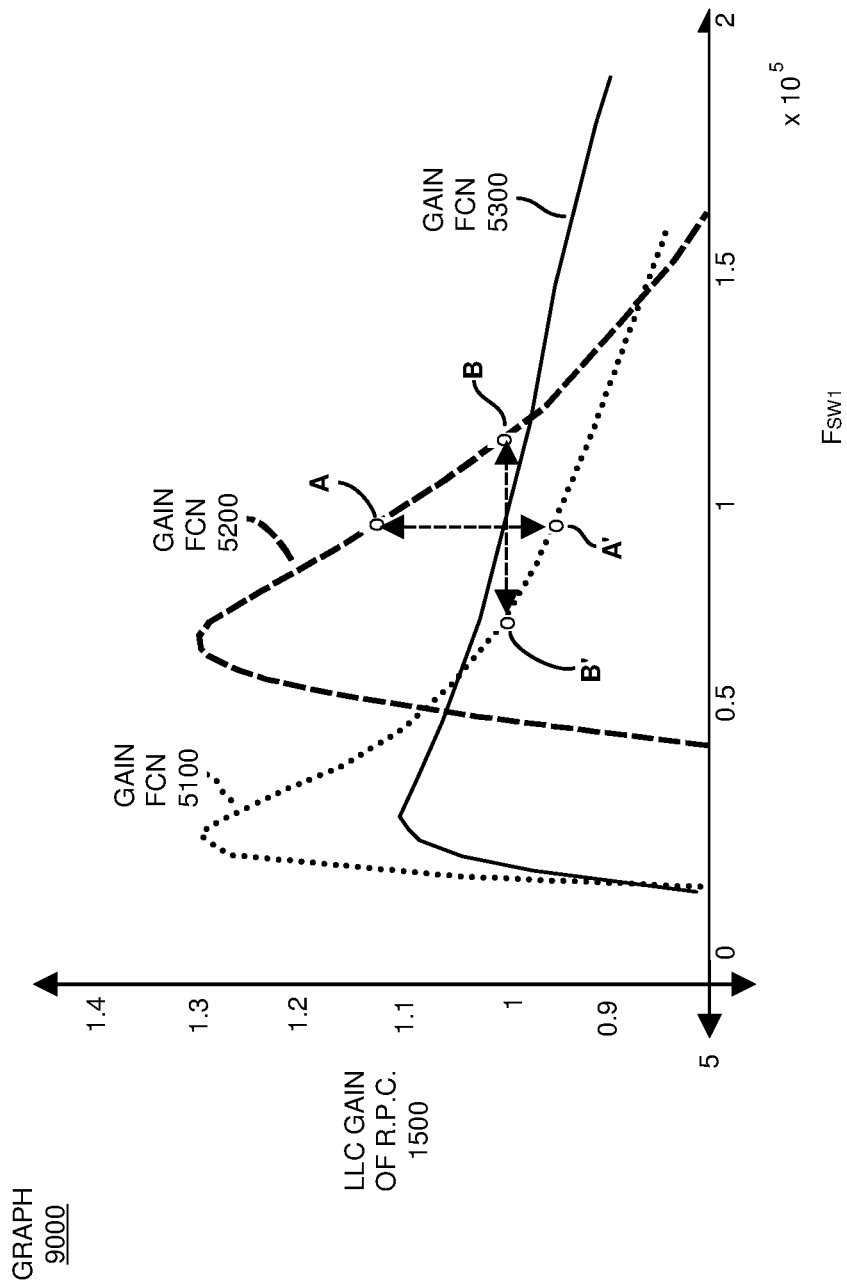
FIG. 26 is an example diagram illustrating adjustment of a switching frequency and/or a gain of a resonant power converter according to embodiments herein.

FIG. 26 is an example diagram illustrating adjustment of a normalized switching frequency and/or a gain of a resonant power converter according to embodiments herein.

As previously discussed, the resonant frequency and/or switching frequency associated with the resonant power converter 1500 can be changed to control operation of the power system 1000 and conversion of the input voltage 1200 to the output voltage 1230.

Figure 27:
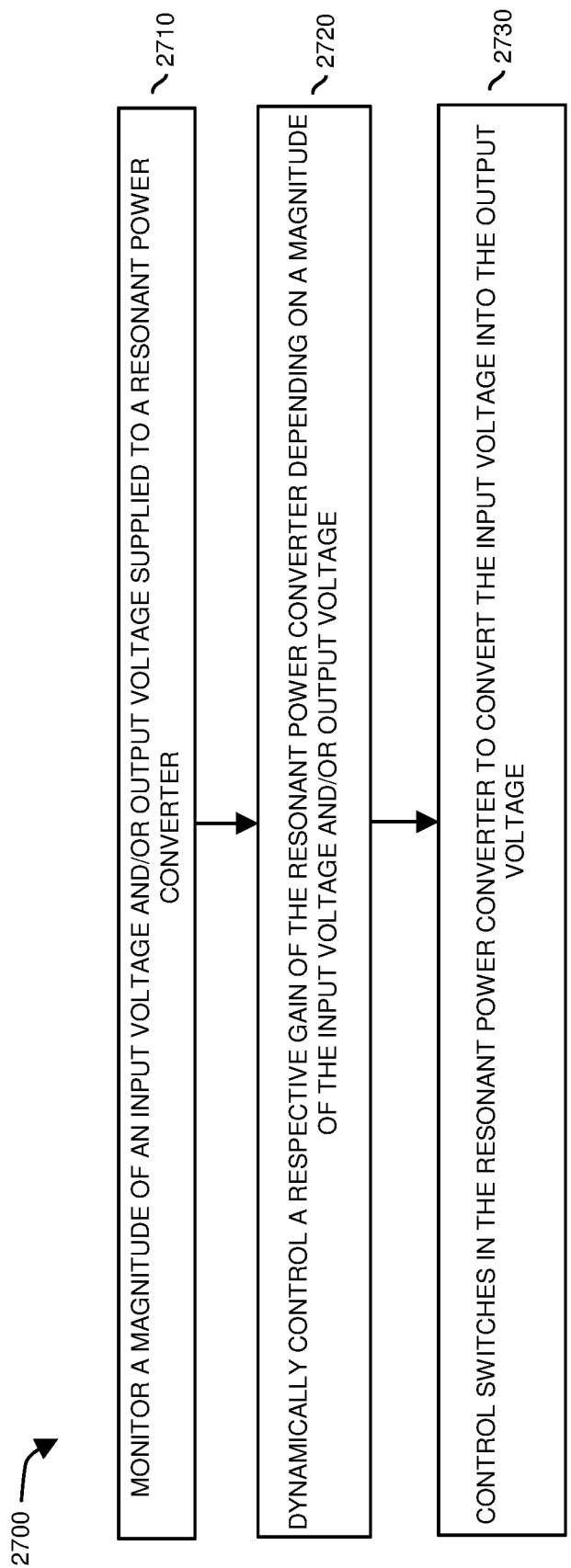
FIG. 27 is an example diagram illustrating a method according to embodiments herein.

FIG. 27 is a flowchart 2700 illustrating an example method according to embodiments herein. Note that there will be some overlap with respect to concepts as discussed above.

In processing operation 2710, the monitor resource 1410 monitors a magnitude of the output voltage 1230 and/or input voltage 1200.

In processing operation 2720, the controller 1400 dynamically controls a respective gain of the resonant power converter 1500 depending on a magnitude of the output voltage 1230 and/or input voltage 1200.

In processing operation 1130, the controller 1400 controls switches S11 and S12 in the resonant power converter 1500 resulting in conversion of the input voltage 1200 into the output voltage 1230.

Figure 28:
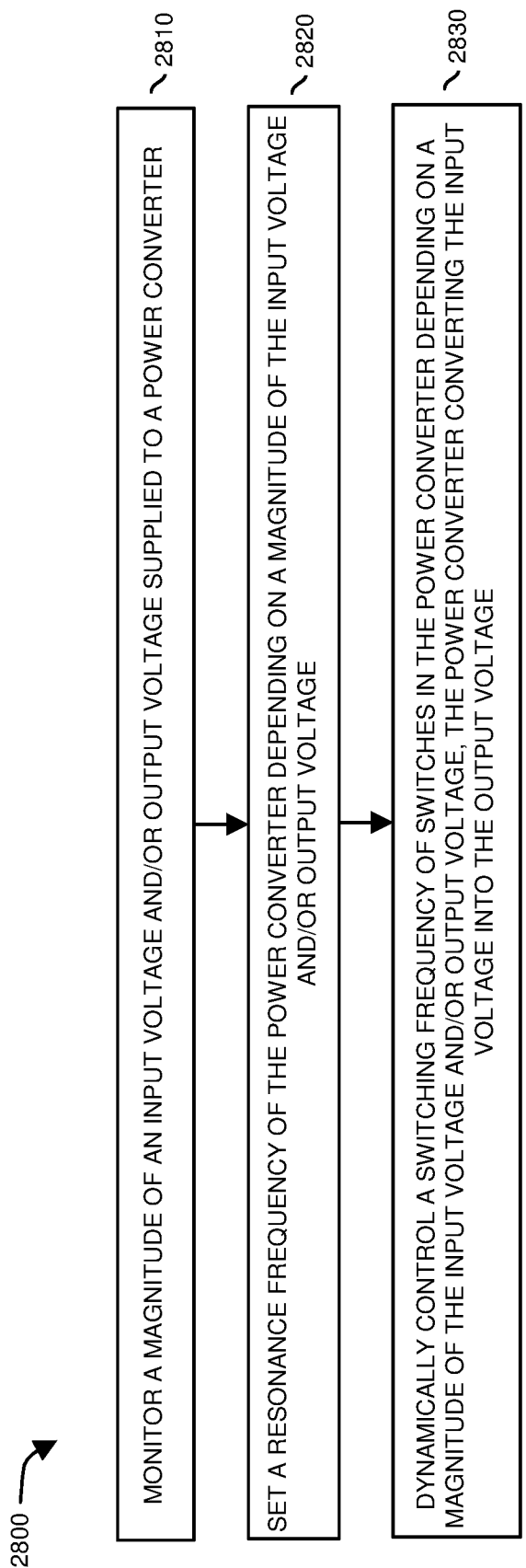
FIG. 28 is an example diagram illustrating a method according to embodiments herein.

FIG. 28 is a flowchart 2800 illustrating an example method according to embodiments herein. Note that there will be some overlap with respect to concepts as discussed above.

In processing operation 2810, the monitor resource 141 monitors a magnitude of an output voltage 1230 and/or input voltage 1200.

In processing operation 2820, the controller 1400 sets a resonance frequency of the power converter 1500 depending on a magnitude of the output voltage 1230 and/or input voltage 1200.

In processing operation 2830, the controller 1400 dynamically controls a switching frequency Fsw1 of switches S11 and S12 in the power converter 1500 depending on a magnitude of the output voltage 1230 and/or input voltage 1200. The power converter 1500 converts the input voltage 1200 into the output voltage 1230.

Figure 29:
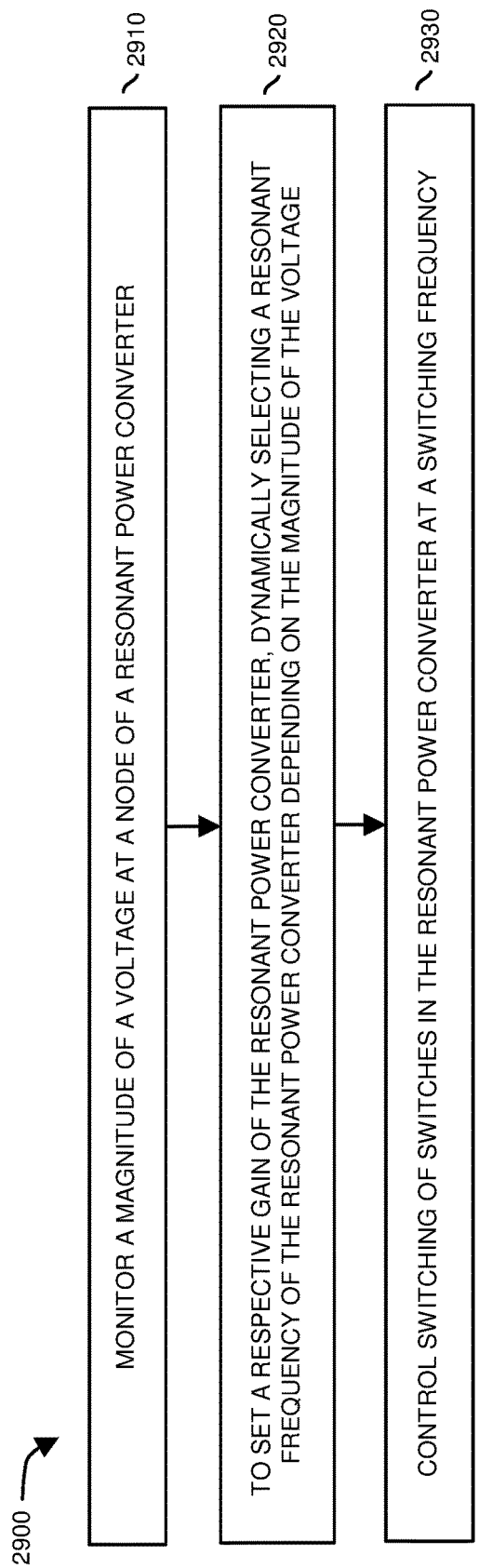
FIG. 29 is an example diagram illustrating a method according to embodiments herein.

FIG. 29 is a flowchart 2900 illustrating an example method according to embodiments herein. Note that there will be some overlap with respect to concepts as discussed above.

In processing operation 2910, a monitor resource monitors a magnitude of a voltage (input voltage, output voltage, or both) at a node of a resonant power converter.

In processing operation 2920, to set a respective gain of the resonant power converter, the controller dynamically selects a resonant frequency of the resonant power converter depending on the magnitude of the voltage.

In processing operation 2930, the controller controls switching of switches in the resonant power converter at a switching frequency.

Figure 30:
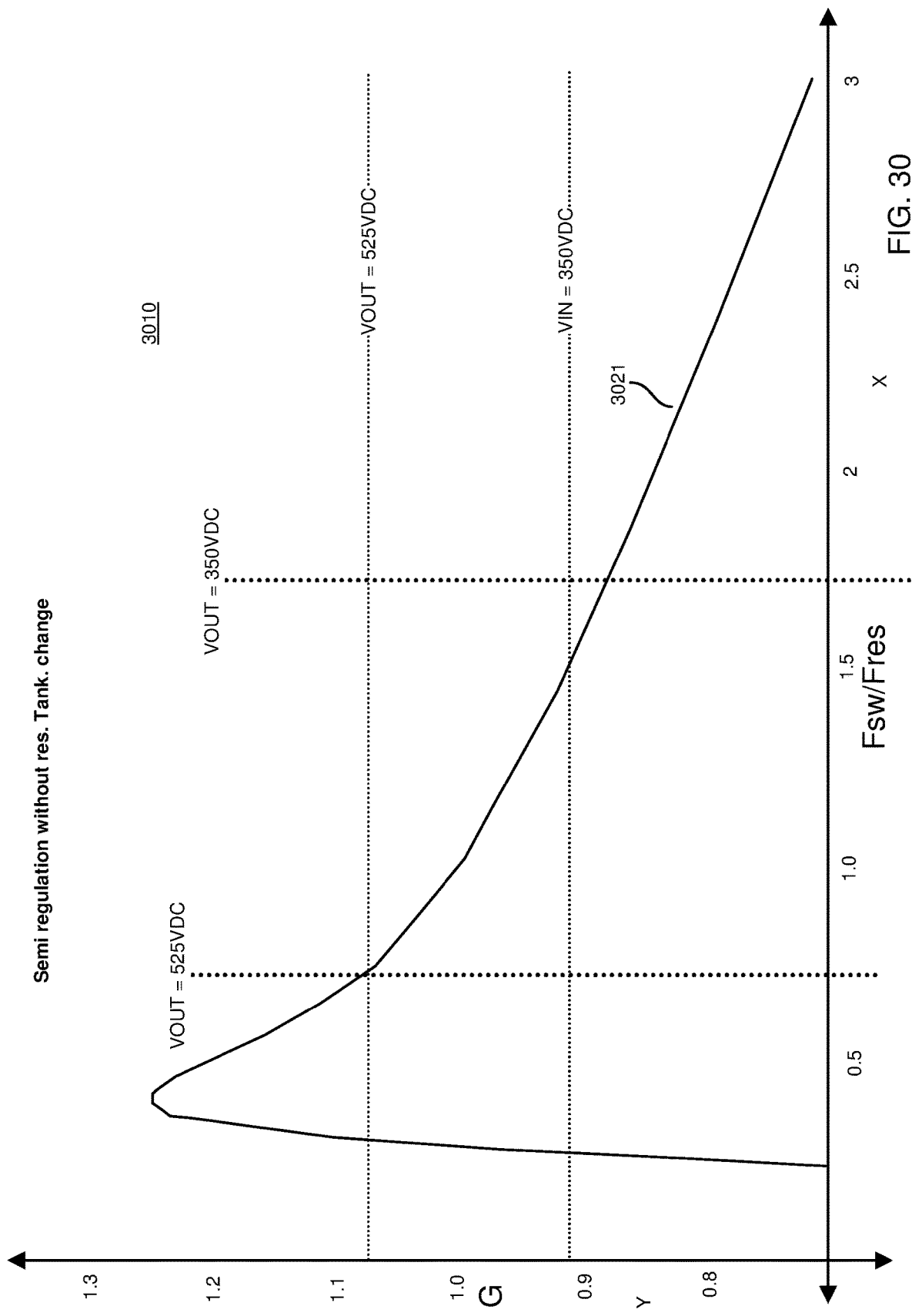
FIG. 30 is an example diagram illustrating operation of a resonant power converter in a semi-regulation mode without changing a resonant frequency according to embodiments herein.

FIG. 30 is an example diagram illustrating operation of a resonant power converter in a semi-regulation mode without changing a resonant frequency according to embodiments herein.

As shown in graph 3010, embodiments herein include implementing a single gain function 3021 (G=Gain) to provide semi regulation without changing the resonant frequency of the resonant power converter 1500 based on the output voltage 1230. As shown in graph 3010, the controller 1400 adjusts the switching frequency (Fsw1) associated with switching of switches S11 and S12 to adjust a gain of the resonant power converter 1500 for different magnitudes of the output voltage 1230 between 350 and 525 VDC or other suitable range.

Figure 31:
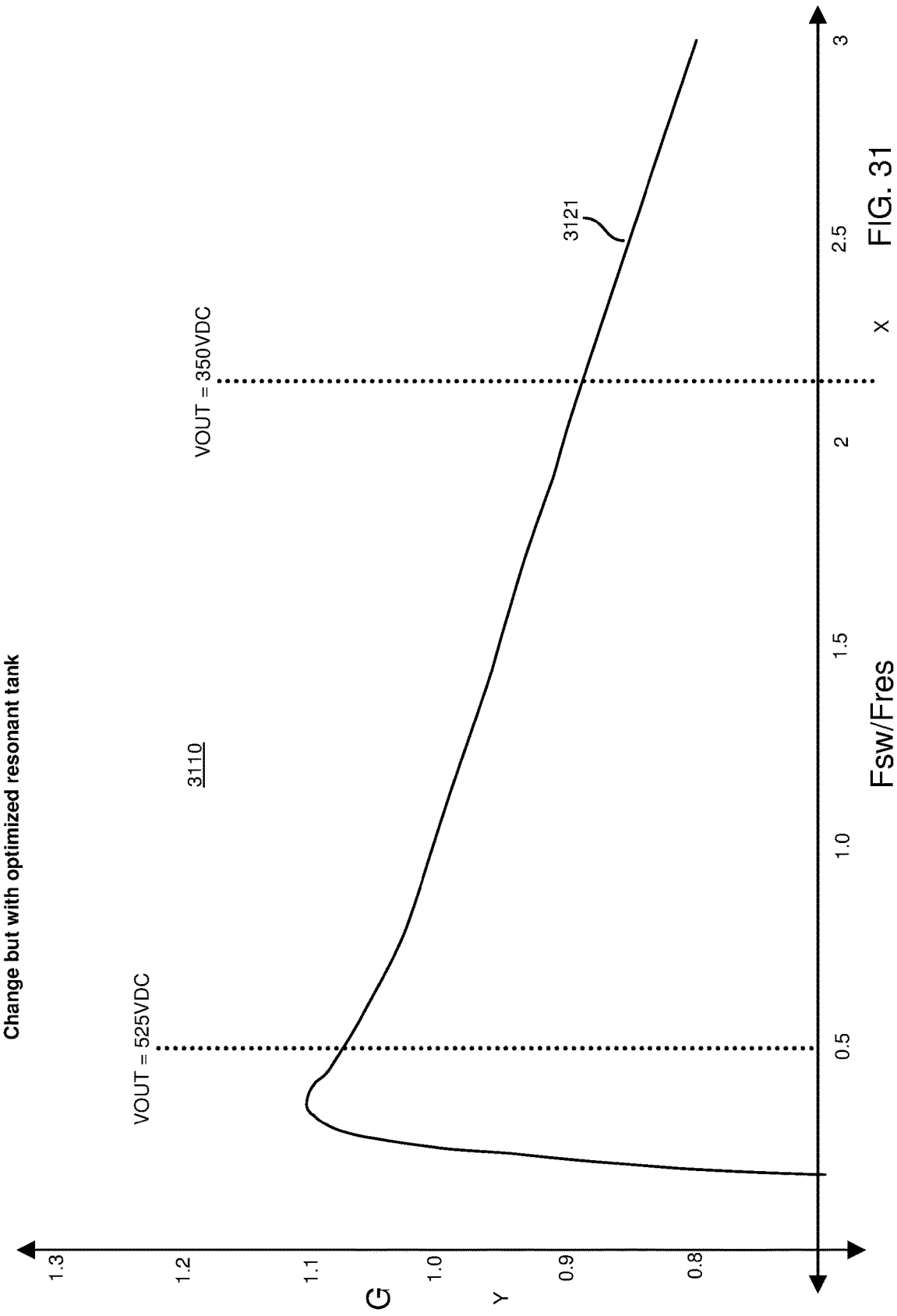
FIG. 31 is an example diagram illustrating operation of a resonant power converter in a semi-regulation mode without changing a resonant frequency but with optimized resonant tank circuit according to embodiments herein.

FIG. 31 is an example diagram illustrating operation of a resonant power converter in a semi-regulation mode without changing a resonant frequency but with optimized resonant tank circuit according to embodiments herein.

In contrast to previous FIG. 30, FIG. 31 shows an optimized resonant tank with a flatter gain curve. Such an optimization reduces the amount of resonant current in the tank and increases the efficiency of the converter.

As shown in graph 3110, embodiments herein include implementing a single gain function 3121 (optimized for output voltages between 350 and 525 VDC, G=Gain) to provide semi regulation without changing the resonant frequency of the resonant power converter 1500 based on the input voltage 1200. As shown in graph 3110, the controller 1400 adjusts the switching frequency (Fsw) associated with switching of switches S11 and S12 to adjust a gain of the resonant power converter 1500 for different magnitudes of the output voltage 1230.

Figure 32:
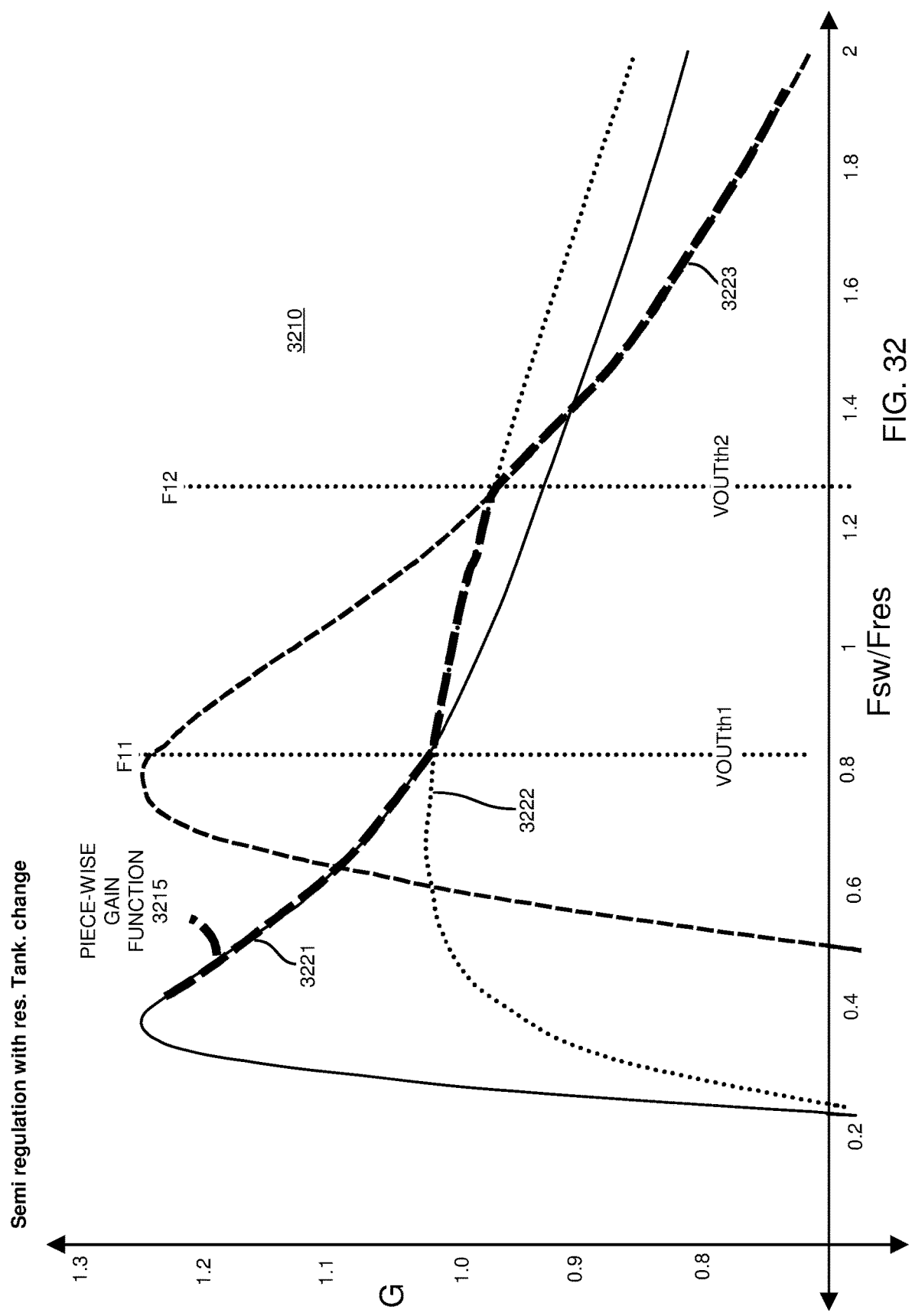
FIG. 32 is an example diagram illustrating operation of a resonant power converter in a semi-regulation mode with changes to a resonant frequency according to embodiments herein.

FIG. 32 is an example diagram illustrating operation of a resonant power converter in a semi-regulation mode with changes to a resonant frequency according to embodiments herein.

As shown in graph 3210, in a manner as previously discussed, embodiments herein include implementing different gain functions (G=Gain) over a range of different output voltages. For example, when the magnitude of the output voltage 1230 is greater than a threshold value Voutth1 (such as when the output voltage 1230 falls in a first range 430-525V), the controller 1400 sets the resonant frequency of the resonant power converter 1500 to a value associated with gain function 3221; when the magnitude of the output voltage 1230 is between threshold value Voutth1 and Voutth2 (such as when the output voltage falls in a second range 407-430V), the controller 1400 sets the resonant frequency of the resonant power converter 1500 to a value associated with gain function 3222; when the magnitude of the output voltage 1230 is less than threshold value Voutth2 (such as when the output voltage falls in a third range 350-407V), the controller 1400 sets the resonant frequency of the resonant power converter 1500 to a value associated with gain function 3223. In each of the different ranges, in a manner as previously discussed, the controller 1500 adjusts the switching frequency Fsw1 and implements hysteresis if the output voltage 1230 changes over time.

Figure 33:
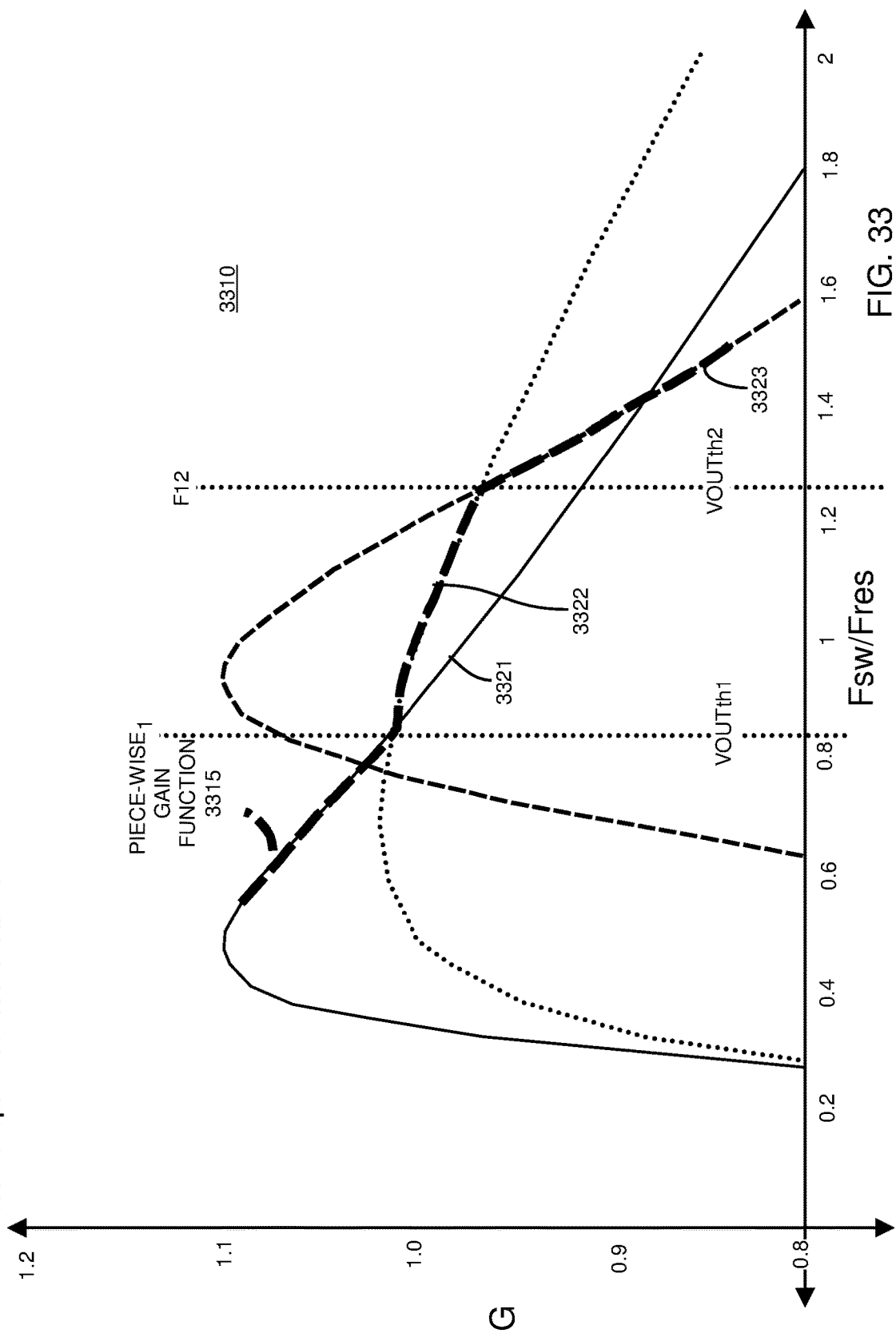
FIG. 33 is an example diagram illustrating operation of a resonant power converter in a semi-regulation mode with changes to a resonant frequency but with optimized resonant tank circuit according to embodiments herein.

FIG. 33 is an example diagram illustrating operation of a resonant power converter in a semi-regulation mode with changes to a resonant frequency but with optimized resonant tank circuit according to embodiments herein.

In contrast to previous FIG. 32, FIG. 33 shows an optimized resonant tank with a flatter gain curve. Such an optimization reduces the amount of resonant current in the tank and increases the efficiency of the converter.

As shown in graph 3310, in a manner as previously discussed, embodiments herein include implementing different optimized gain functions (G=Gain) over a range of different input voltages. For example, when the magnitude of the output voltage 1230 is greater than a threshold value Voutth1 (such as when the output voltage falls in a first range), the controller 1400 sets the resonant frequency of the resonant power converter 1500 to a value associated with gain function 3321; when the magnitude of the output voltage 1200 is between threshold value Voutth1 and Voutth2 (such as when the input voltage falls in a second range), the controller 1400 sets the resonant frequency of the resonant power converter 1500 to a value associated with gain function 3322; when the magnitude of the output voltage 1230 is less than threshold value Voutth2 (such as when the input voltage falls in a third range), the controller 1400 sets the resonant frequency of the resonant power converter 1500 to a value associated with gain function 3323. In each of the different ranges, in a manner as previously discussed, the controller 1500 adjusts the switching frequency Fsw1 and implements hysteresis as the input voltage changes over time.

Note again that techniques herein are well suited for use in switching power supply and resonant power converter applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A power system comprising:
  a monitor resource operative to monitor a magnitude of a voltage at a node of a resonant power converter;
  a controller operative to, depending on the magnitude of the voltage at the node, dynamically control a respective gain provided by the resonant power converter;
  wherein the controller is further operative to: depending on the magnitude of the voltage, and to provide the respective gain, adjust a resonant frequency of the resonant power converter; and
  wherein the controller is further operative to: i) detect a first voltage range in which the magnitude of the voltage resides, the first voltage range being one of multiple voltage ranges associated with operation of the resonant power converter, ii) identify a resonant frequency setting assigned to the first voltage range, and iii) control the resonant power converter to operate at the identified resonant frequency setting.

2. The power supply as in claim 1, wherein the controller is further operative to determine a switching frequency in which to control switches in the resonant power converter based on a combination of the resonant frequency of the resonant power converter and the magnitude of the voltage at the node.

3. The power supply as in claim 2, wherein operation of the resonant power converter at the resonant frequency and the determined switching frequency is operative to control the respective gain of the resonant power converter.

4. The power system as in claim 1, wherein the controller is further operative to map the magnitude of the voltage to a switching frequency value and set a switching frequency of controlling switches in the resonant power converter to the switching frequency value.

5. The power system as in claim 1, wherein each of the multiple voltage ranges is assigned a different resonant frequency setting.

6. The power system as in claim 1, wherein the controller is operative to set a magnitude of a switching frequency of operating switches in the resonant power converter to a fixed value; and
  wherein the controller is operative to vary a magnitude of a resonant frequency of the resonant power converter depending on variations in the magnitude of the voltage.

7. The power system as in claim 6, wherein each voltage range of the multiple voltage ranges is assigned a different respective resonant frequency setting.

8. A system comprising:
a circuit board;
the power system of claim 1, the power system being a power supply fabricated on the circuit board; and
a load, the load powered via power provided by the resonant power converter.

9. A method comprising:
receiving a circuit board; and
fabricating the power system of claim 1 on the circuit board, the power system being a power supply operative to output power subsequently used to power a load affixed to the circuit board.

10. The power supply as in claim 1, wherein the voltage is an output voltage of the resonant power converter.

11. A method comprising:
monitoring a magnitude of a voltage at a node of a resonant power converter;
to set a respective gain of the resonant power converter, dynamically selecting a resonant frequency of the resonant power converter depending on the magnitude of the voltage; and
controlling switching of switches in the resonant power converter at a switching frequency;
wherein a voltage range associated with the voltage at the node is divided into multiple voltage ranges, each of the multiple voltage ranges assigned a resonant frequency setting of the power converter;
wherein the multiple voltage ranges include a first voltage range and a second voltage range, the first voltage range being assigned a first resonant frequency setting, the second voltage range being assigned a second resonant frequency setting; and
wherein the respective gain of the resonant power converter is a piece-wise gain function including a first gain function associated with the first voltage range and a second gain function associated with the second voltage range.

12. The method as in claim 11 further comprising:
selecting a magnitude of the switching frequency based on a combination of the resonant frequency and the magnitude of the voltage.

13. The method as in claim 11, wherein controlling switching of the switches includes:
mapping the magnitude of the voltage to a switching frequency value; and
setting the switching frequency of controlling the switches in the resonant power converter to the switching frequency value.

14. The method as in claim 11 further comprising:
controlling the resonant frequency of the resonant power converter to be a fixed resonant frequency setting during conditions in which the magnitude of the voltage resides within the first voltage range of the multiple voltage ranges; and
while the resonant frequency of the resonant power converter is set to the fixed resonant frequency setting, adjusting a magnitude of the switching frequency as the magnitude of the voltage varies within the first voltage range.

15. The method as in claim 11 further comprising:
while a magnitude of the switching frequency applied to the switches is set to a fixed frequency value, varying a magnitude of the resonant frequency of the resonant power converter depending on variations of the magnitude of the voltage.

16. The method as in claim 11 further comprising:
producing map information providing a mapping between the magnitude of the voltage at the node and a setting of the switching frequency to be applied to the switches in the resonant power converter.

17. A method comprising:
monitoring a magnitude of a voltage at a node of a resonant power converter;
to set a respective gain of the resonant power converter, dynamically selecting a resonant frequency of the resonant power converter depending on the magnitude of the voltage, the dynamic selecting including: i) detecting a first voltage range in which the magnitude of the voltage resides, the first voltage range being one of multiple voltage ranges; ii) identifying a resonant frequency setting assigned to the first voltage range; and iii) controlling the resonant power converter to operate at the identified resonant frequency setting assigned to the first voltage range;
the method further comprising: controlling switching of switches in the resonant power converter at a switching frequency;
wherein controlling switching of the switches includes: i) mapping the magnitude of the voltage to a switching frequency value; and ii) setting the switching frequency of controlling the switches in the resonant power converter to the switching frequency value.

18. The method as in claim 17, wherein each of the multiple voltage ranges is assigned a different resonant frequency setting.

19. A power system comprising:
a monitor resource operative to monitor a magnitude of an input voltage at a node of a resonant power converter;
a controller operative to, depending on the magnitude of the input voltage at the node, dynamically control a respective gain provided by the resonant power converter to convert the input voltage into an output voltage; and
wherein the controller is further operative to: i) control a resonant frequency of the resonant power converter to be a fixed resonant frequency setting during conditions in which the magnitude of the input voltage falls within a first voltage range; and ii) vary a magnitude of a switching frequency applied to switches in the resonant power converter depending on the magnitude of the input voltage within the first voltage range;
wherein the controller is further operative to:
select the fixed resonant frequency setting in response to detecting that the magnitude of the input voltage resides in a first voltage range, the selected fixed resonant frequency setting assigned to the first voltage range; and
operate the resonant power converter at the selected fixed resonant frequency setting.

20. The power supply as in claim 19, wherein the controller is further operative to determine the switching frequency in which to control the switches in the resonant power converter based on a combination of the resonant frequency of the resonant power converter and the magnitude of the input voltage at the node.

21. The power supply as in claim 20, wherein operation of the resonant power converter at the resonant frequency and the applied switching frequency is operative to control the respective gain of the resonant power converter.

22. The power system as in claim 19, wherein the controller is further operative to map the magnitude of the input voltage to the switching frequency value and set the switching frequency of controlling switches in the resonant power converter to the switching frequency value.

* * * * *